United States Patent [19]

Yamamoto et al.

[11]  4,329,708
[45]  May 11, 1982

[54] DIGITAL SIGNAL PROCESSING APPARATUS

[75] Inventors: Kaichi Yamamoto, Zama; Kazuo Yoshimoto, Isehara, both of Japan

[73] Assignee: Sony Corporation, Tokyo, Japan

[21] Appl. No.: 192,358

[22] Filed: Sep. 30, 1980

[30] Foreign Application Priority Data

Oct. 25, 1979 [JP]  Japan ............................... 54-138107

[51] Int. Cl.³ ..................... H04N 5/14; G06F 11/10; G06F 11/12
[52] U.S. Cl. ........................................ 358/36; 358/37; 358/166; 358/167; 360/38; 371/38
[58] Field of Search ..................... 358/8, 36, 37, 160, 358/166, 167; 371/30, 31, 35, 37, 38; 360/38

[56] References Cited

U.S. PATENT DOCUMENTS 4,206,440  6/1980  Doi et al. ........................... 371/38 X
4,238,852 12/1980  Iga et al. ........................... 371/38 X

Primary Examiner—Robert L. Richardson
Attorney, Agent, or Firm—Lewis H. Eslinger; Alvin Sinderbrand

[57] ABSTRACT

In a digital video signal processing apparatus having error correcting and concealing capabilities, a video signal is converted to a digital signal and transmitted or recorded with error detecting and error correcting signals. Upon receiving or reproducing the transmitted signal, an error in th digitized video signal is detected by means of the error detecting signal, and corrected, if possible, by means of the error correcting signal. If the error is so extensive that its correction by the error correction signal is not possible, the erroneous signal is concealed by its replacement with a substantially corresponding signal of the previous field which has been stored in a suitable memory.

24 Claims, 90 Drawing Figures

FIG.6
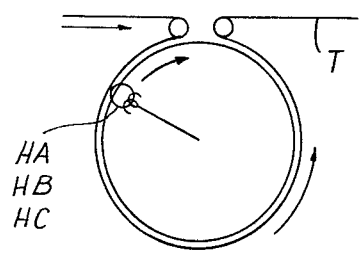
FIG.7
HA -☐☐
HB -☐☐
HC -☐☐
FIG.8
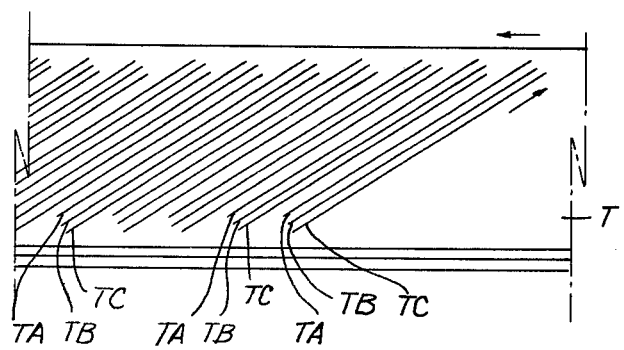
FIG.9
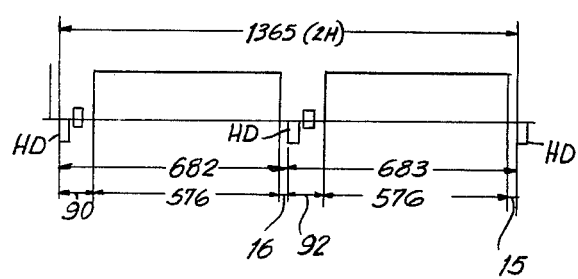
FIG.10
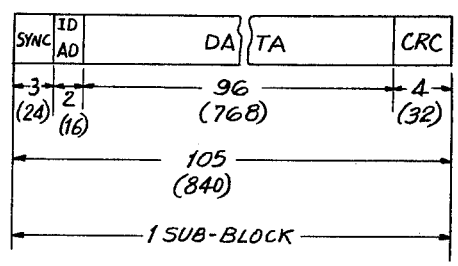

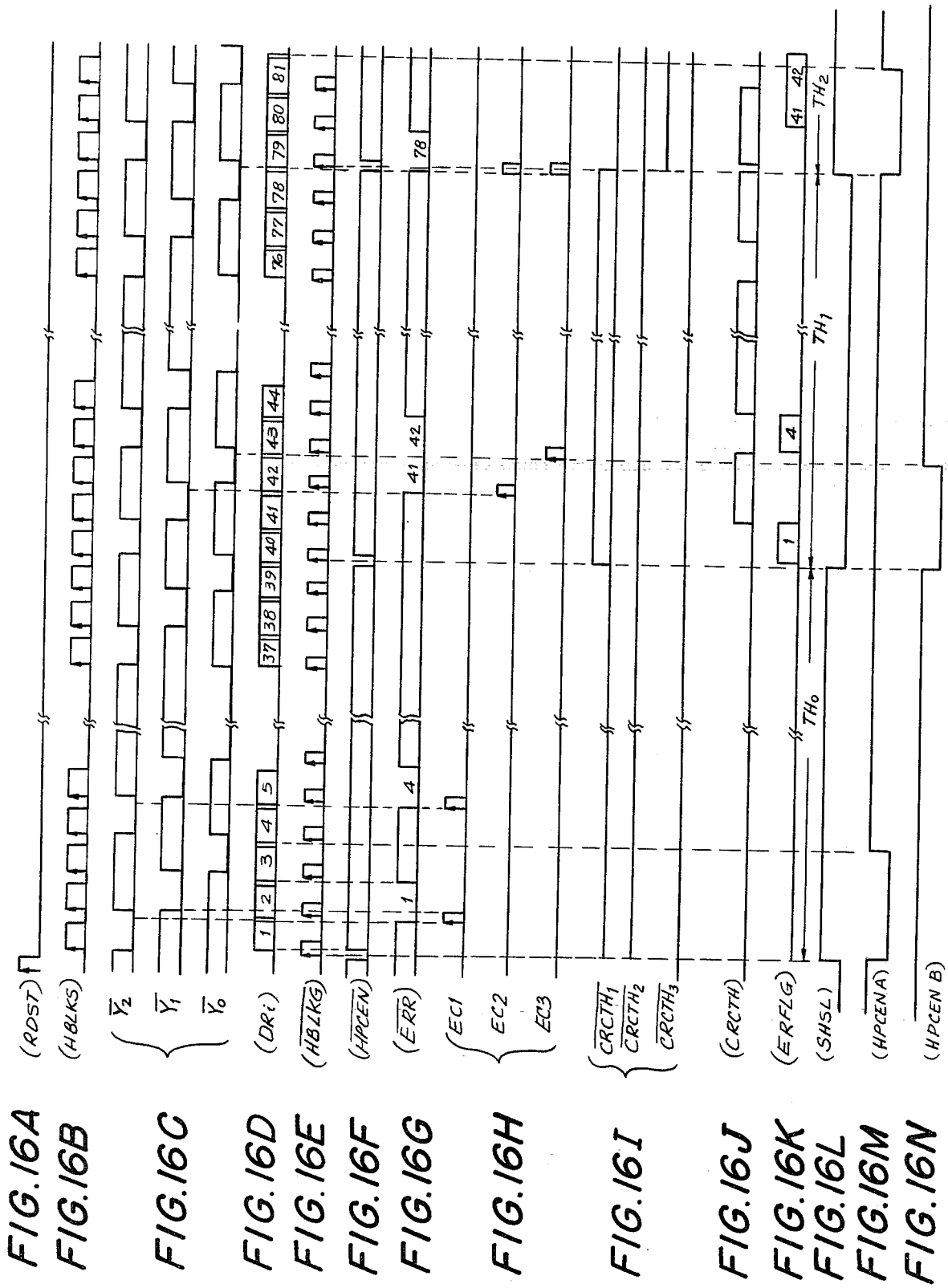

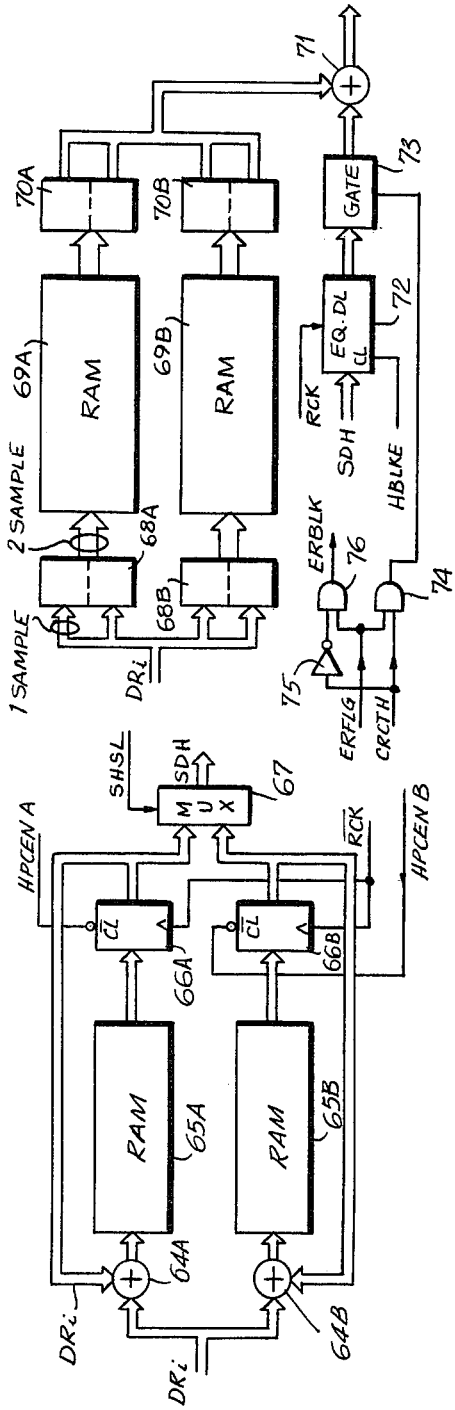

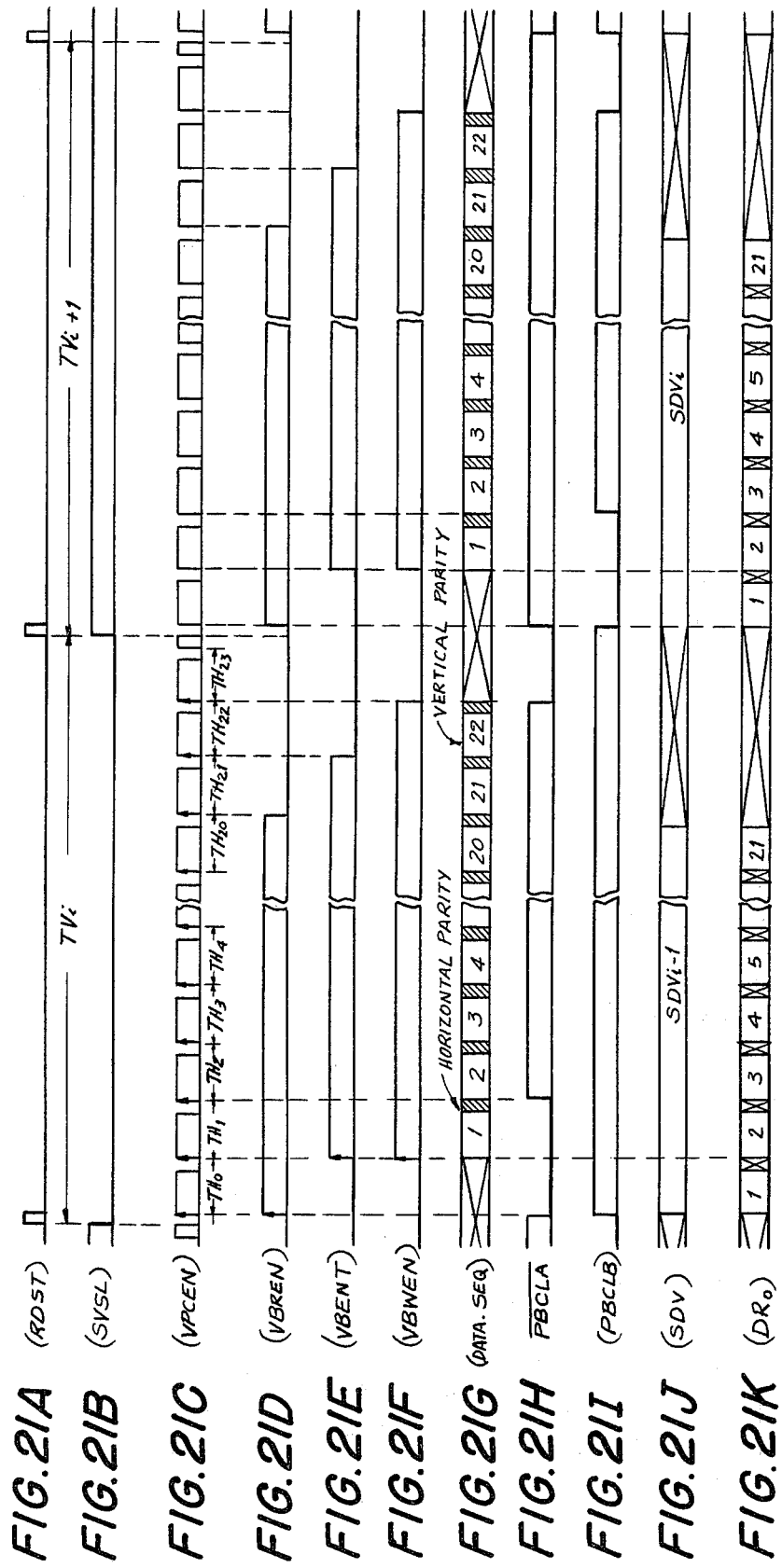

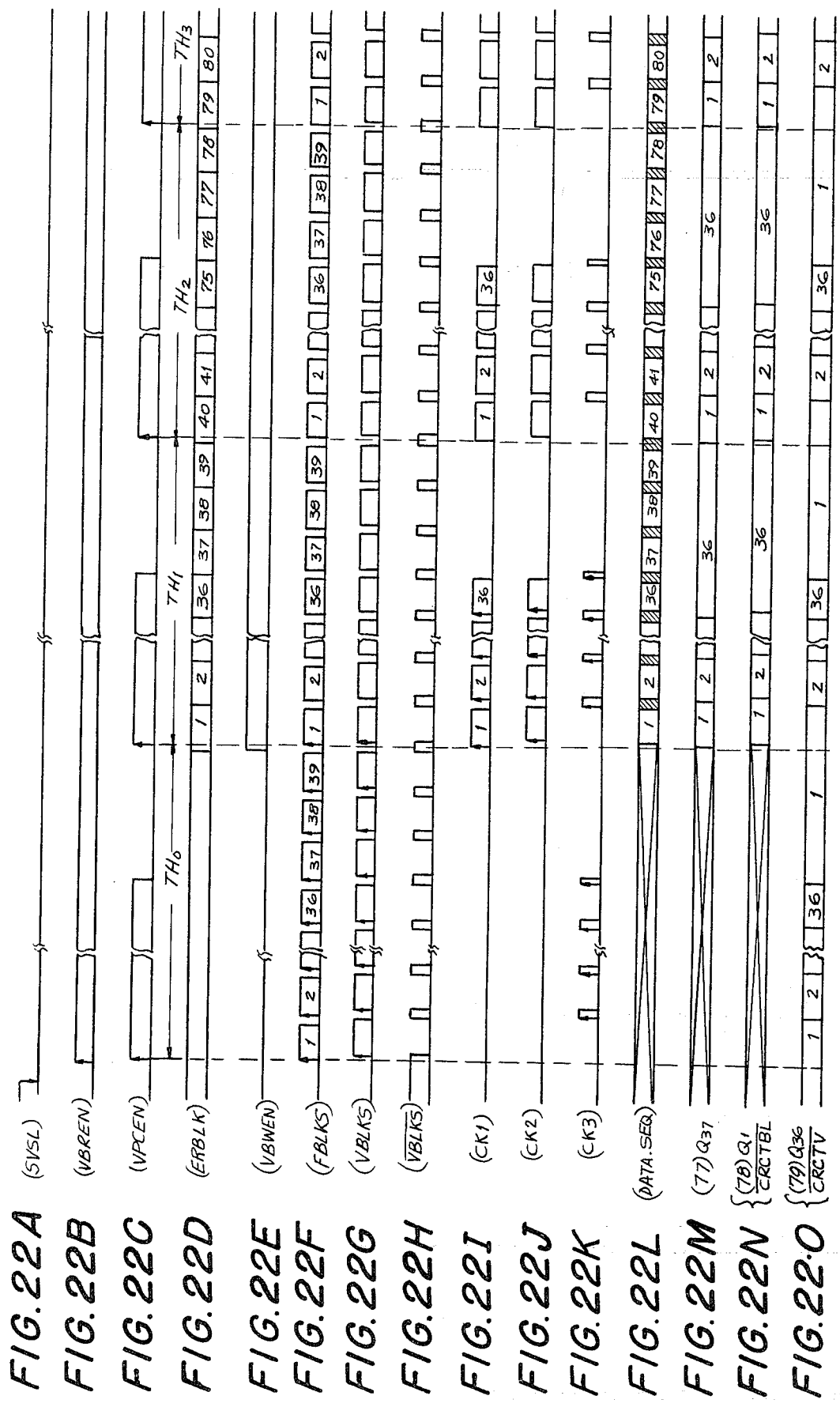

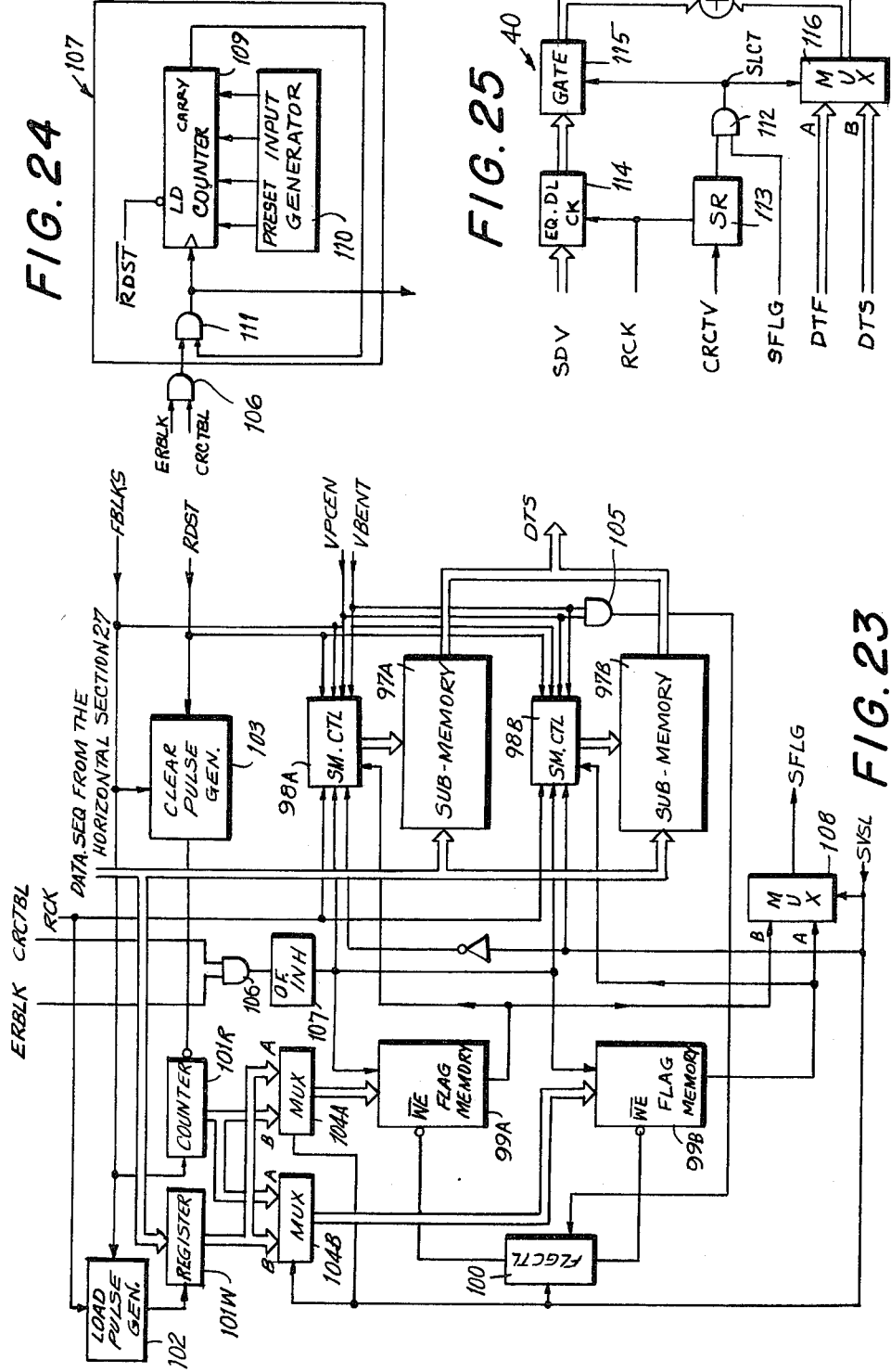

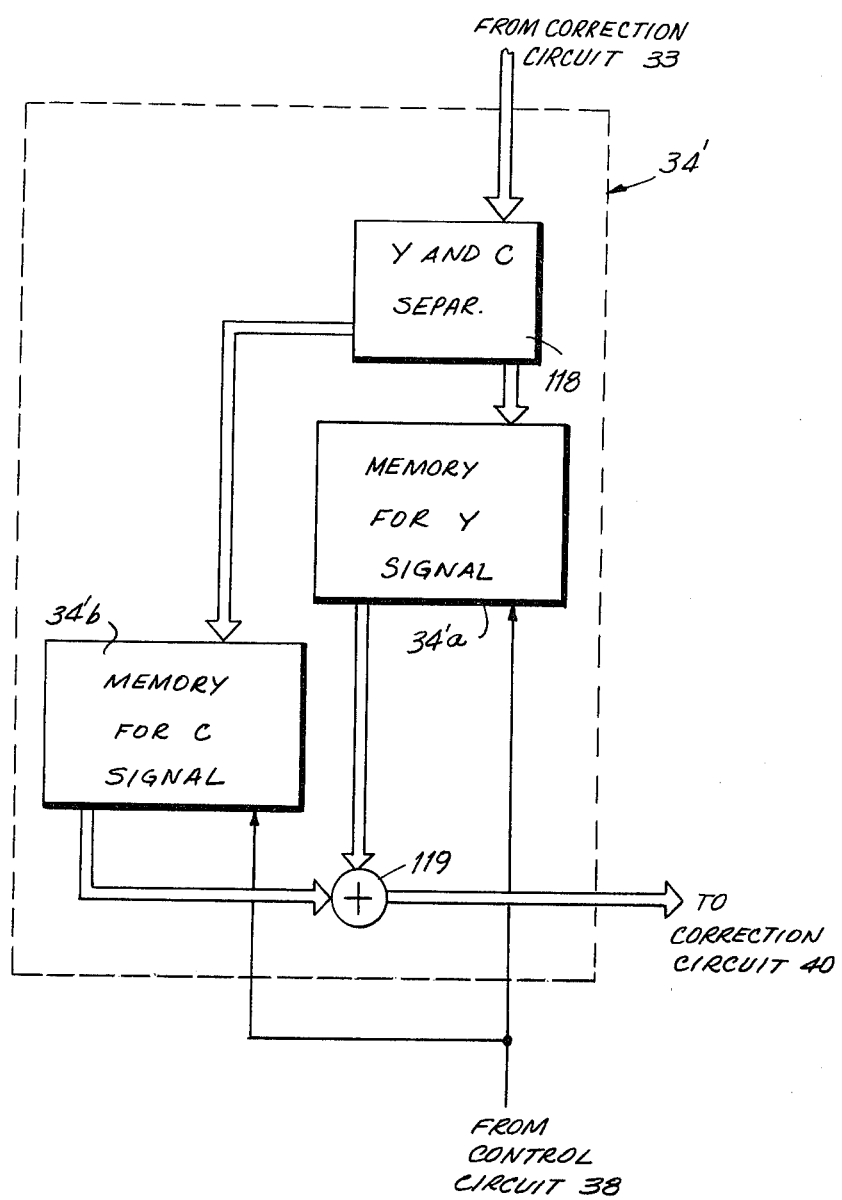

DIGITAL SIGNAL PROCESSING APPARATUS

BACKGROUND OF THE INVENTION

1. Field of the Invention

This invention relates generally to an error correcting and concealing system, and more particularly is directed to an error correcting and concealing system which is applied to a digital signal processing apparatus, such as, a digital video tape recorder.

2. Description of the Prior Art

In recording and reproducing a digital video signal by a rotary head type video tape recorder (VTR), random errors may result from head noise, tape noise or amplifier noise or a burst error may be caused by a signal dropout. It is a recognized advantage of digital signal processing that erroneous data can be mathematically corrected by the inclusion in the recorded or transmitted data of redundant bits. For example, a well known scheme for correcting digital data involves dividing the latter into blocks, each of which is recorded or transmitted along with a parity obtained by modulo 2 addition for each block so that, upon reproduction or reception, an error in any such block can be corrected on the basis of the respective parity. However, the addition to the recorded information data of the redundant bits representing the parity for the purpose of protecting the information data from errors necessarily increases the recording bit rate which is limited by the necessity of minimizing the consumption of tape. Therefore, even if the code arrangement of the digital video signal is designed to be capable of error correction, the extent of the error may sometimes exceed the error correcting ability which is limited by the acceptable redundancy.

It has further been proposed to conceal an error in a transmitted or recorded video signal so that such error will not be noticed in the displayed picture.

One error concealing method that has already been proposed involves interpolation of the erroneous data with data of the immediately preceding line of the same field, and such method relies on the strong correlation of a television picture in the vertical direction. Another conventional error concealing method involves replacement of the erroneous data with a mean value of data from the lines immediately preceding and following the line containing the error.

The above error concealing methods both obtain a signal for interpolation or substitution for the erroneous data from the data of the same field. Incidentally, since the television picture is formed by interlaced scanning, it will be appreciated that adjacent lines in the same field are spaced apart by a distance that is twice the distance between adjacent lines in the pictorial representation of the complete frame made up of two interlaced fields. Therefore, the data in immediately adjacent lines, respectively, of such pictorial representation of the complete frame and which occur in contiguous fields of the video signal have an even higher correlation therebetween.

Accordingly, it has been proposed by the assignee of this application to effect error concealment by replacing error-containing data in a line of one field with corresponding data in the line of the next previous field which, in the pictorial representation of the complete frame, is positioned immediately adjacent the error-containing line so that the data used for concealing an error will bear a closer resemblance to the original or correct data which it replaces.

If the error concealment technique is relied upon exclusively, picture degradation becomes a problem, particularly after multiple generations of dubbing, unless the rate or error occurrence is very low.

OBJECTS AND SUMMARY OF THE INVENTION

Accordingly, it is an object of this invention to provide a digital video signal processing apparatus which is capable of correcting and/or concealing errors in the digital video signal without undesirably increasing the redundant bits of the transmitted or recorded signal and without degradation of the picture resulting from the processed signal.

More particularly, it is an object of this invention to provide an error correcting and/or concealing method and apparatus, as aforesaid, which is suitable for use with a digital video tape recorder (VTR) in which an analog video signal is converted to a digital signal and recorded on a magnetic tape.

It is another object of this invention to provide an error correcting and/or concealing method and apparatus, as aforesaid, for use with a digital video processing apparatus and which does not require a one-line delay circuit or mean value forming circuit.

It is a further object of this invention to provide an error correcting and/or concealing system which can use a field memory effectively for both error concealment and error correction.

According to an aspect of the invention, in processing a digital signal which forms a data block for every predetermined number of bits and which includes error detecting and error correcting signals, an error in a data block of the digital signal is detected by means of the error detecting signal, each error-free data block is written in a first memory, an error-containing data block is written in a second memory, a data block is selectively read out from the first memory or from the second memory, and an error of a data block read out from the second memory is corrected by means of the respective error correcting signal.

In the case in which the digital signal to be processed is converted from an analog video signal a field memory is desirably used as the first memory, and each error-free data block is written at an address in the first memory corresponding to that at which there was earlier written a data block of a line of the next previous field which, in the pictorial representation of a complete frame, is positioned immediately adjacent the line of the error-free data block being written. When an error contained in a data block is judged to be too extensive for correction by the respective error correcting signal, the writing of such error-containing data block in the second memory is inhibited and the error is concealed by means of the error-free data block earlier written at the corresponding address of the first memory for the next previous field.

In the method and apparatus according to the invention, an error detecting code is added for each data block to form a signal block therewith and, after arranging a plurality of the signal blocks in a matrix form, error correcting codes are added for each column and row of the matrix, whereby an error correction is performed in every column and every row.

The above, and other objects, features and advantages of this invention, will be apparent from the following detailed description which is to be read in conjunction with the accompanying drawings.

BRIEF DESCRIPTION OF THE DRAWINGS

FIGS. 3A–3I are schematic diagrams to which reference will be made in explaining address control for a field memory;

FIG. 6 is a schematic illustration of a rotary head assembly included in the digital VTR of FIGS. 4 and 5;

FIG. 7 is a schematic view of rotary heads included in the assembly of FIG. 6;

FIG. 8 is a schematic plan view of a section of magnetic tape showing tracks in which signals are recorded;

FIGS. 9, 10 and 11 are schematic diagrams to which reference will be made in explaining the digitization and code arrangement of a video signal for use in the digital VTR embodying this invention;

FIGS. 12A–12D are timing charts to which reference will be made in explaining the operation of an error control encoder included in the recording section of FIG. 4;

FIGS. 16A–16N are timing charts to which reference will be made in explaining the operation of the horizontal judging circuit of FIG. 15;

FIG. 17 is a block diagram of a horizontal parity checker included in the error correcting decoder of FIG. 13;

FIGS. 18A–18H are timing charts to which reference will be made in explaining the operation of the horizontal parity checker of FIG. 17;

FIG. 19 is a block diagram illustrating, by way of example, a buffer memory and a horizontal error correcting circuit included in the error correcting decoder of FIG. 13;

FIGS. 21A–21K and FIGS. 22A–22O are timing charts to which reference will be made in explaining the operation of the vertical judging circuit of FIG. 20;

FIG. 23 is a block diagram showing, by way of example, a sub-memory and its associated circuit arrangement that may be included in the error correcting decoder of FIG. 13;

FIG. 24 is a block diagram illustrating an example of an overflow preventing circuit included in the circuit of FIG. 23;

FIG. 25 is a block diagram illustrating an example of an error correcting circuit included in the error correcting decoder of FIG. 13; and FIG. 26 is a simplified block diagram illustrating a modification of an error correcting decoder according to the invention in which individual memories are provided for the luminance and the chrominance components of a reproduced NTSC color video signal.

DESCRIPTION OF THE PREFERRED EMBODIMENTS

In order to facilitate a better understanding of the present invention, there will first be described the conditions for digital recording of an NTSC color video signal.

The NTSC system color video signal is desirably digitized with the following conditions being established:

1. Since one frame comprises 525 lines, the numbers of lines selected for a first (third) and a second (fourth) field are 262 and 263, respectively. In the first field, a vertical synchronizing pulse and a horizontal synchronizing pulse are in phase with each other, and the field in which they are out of phase is considered the second field.

2. The number of sampled picture elements in each horizontal period (H) varies with the sampling frequency (fs) employed. Since the color subcarrier frequency (fsc) is 455/2 times the horizontal frequency (fh), the numbers of sampled picture elements in one horizontal period are as shown in the below Table 1 in the case of fs=3fc and in the case of fs=4fc.

TABLE 1

| fs | | Even line | Odd line |
|---|---|---|---|
| 3 fsc | Odd frame | 682 | 683 |
| | Even frame | 683 | 682 |
| 4fsc | Odd frame | 910 | 910 |
| | Even frame | 910 | 910 |

In the case of fs=3fsc, the number of sampled picture elements in the line in which the horizontal synchronizing pulse and the color subcarrier are in phase with each other is taken as 682, and the number of sampled picture elements in the line in which the horizontal synchronizing pulse and the color subcarrier are out of phase is taken as 683. The odd frame starts with the line in which the horizontal synchronizing pulse and color subcarrier are out of phase from each other, whereas the even frame starts with the line in which they are in phase with each other. As will be appreciated from Table 1, in the case of fs=3fsc, the numbers of sampled picture elements in adjacent lines which are in the same field but differ by one horizontal period (1H) in time from each other are different, but if data of the line of the previous field which is positioned one line below is used as an interpolation line, the numbers of sampled picture elements in the erroneous line and in the interpolation line become equal to each other. Further, as will be evident from the following description, the color subcarriers of the respective sampled picture elements in both of such lines are also of the same phase.

Figure 2A:
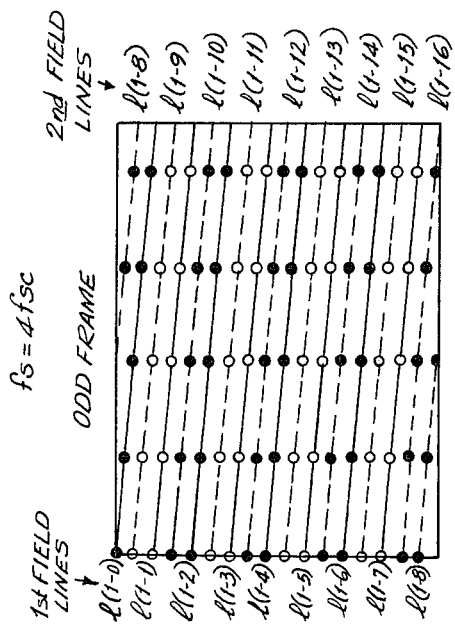
FIGS. 1A and 1B and FIGS. 2A and 2B are schematic diagrams illustrating typical sampling positions of a digital video signal and the phase of a color subcarrier.
Figure 2B:
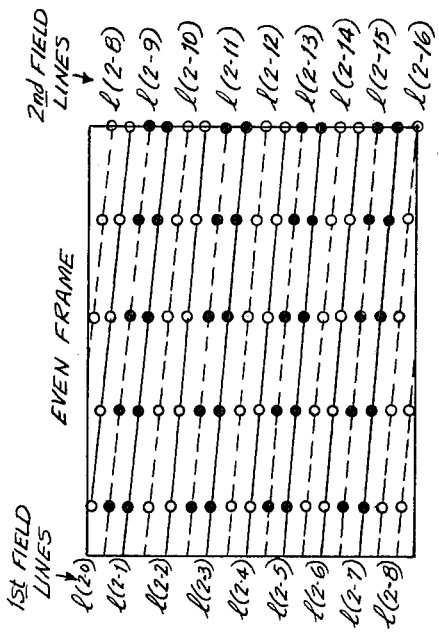
Figure 1A:
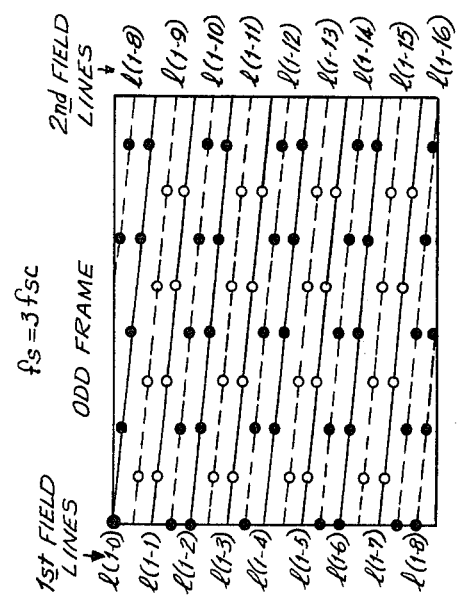
Figure 1B:
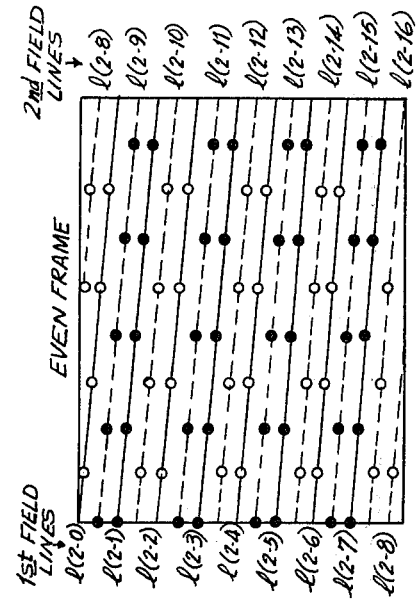

FIGS. 1A and 1B and FIGS. 2A and 2B show numbers of lines and sampled picture elements which are substantially smaller than the actual numbers therefor given in Table 1 for the purpose of simplifying and clarifying the relation of the numbers of sampled picture elements and the phase of the color subcarrier. FIGS. 1A and 1B represent the case of fs=3fsc and FIGS. 2A and 2B represent the case of fs=4fsc. In the NTSC color television system, the phase of the color subcarrier is inverted between adjacent lines in a field, and also between adjacent frames. Further, at each sampling point, the color subcarrier is shown to have a predetermined phase. Therefore, the phase variations (a phase difference $\pi$) of the color subcarrier at the sampling points of the respective lines are indicated by black and white circles on FIGS. 1A and 1B and FIGS. 2A and 2B, in which lines of the first field are indicated by solid lines and the lines of the second field are indicated by broken lines.

In the case of fs=3fsc, an odd frame, for example, the picture elements and in the phase of their color subcarriers, as will be seen from FIGS. 1A and 1B. Table 2 below shows the interpolation lines which respectively correspond to the lines l(1-0) to l(2-16) in case any of these lines are erroneous. For the sake of brevity, in Table 2, lines of a field preceding the first field of the first frame are also indicated by the line numbers in the second frame and the prefix "l" is omitted:

TABLE 2

| Erroneous line | 1-0 | 1-1 | 1-2 | 1-3 | 1-4 | 1-5 | 1-6 | 1-7 | 1-8 | 1-9 | 1-10 | 1-11 |
|---|---|---|---|---|---|---|---|---|---|---|---|---|
| Interpolation line | 2-9 | 2-10 | 2-11 | 2-12 | 2-13 | 2-14 | 2-15 | 2-16 | 1-0 | 1-1 | 1-2 | 1-3 |
| Erroneous line | 1-12 | 1-13 | 1-14 | 1-15 | 1-16 | 2-0 | 2-1 | 2-2 | 2-3 | 2-4 | 2-5 | |
| Interpolation line | 1-4 | 1-5 | 1-6 | 1-7 | 1-8 | 1-9 | 1-10 | 1-11 | 1-12 | 1-13 | 1-14 | |
| Erroneous line | 2-6 | 2-7 | 2-8 | 2-9 | 2-10 | 2-11 | 2-12 | 2-13 | 2-14 | 2-14 | 2-15 | |
| Interpolation line | 1-15 | 1-16 | 2-0 | 2-1 | 2-2 | 2-3 | 2-4 | 2-5 | 2-6 | 2-7 | 2-8 | | first frame is as shown in FIG. 1A. In the first field of the first frame, eight lines l(1-0), l(1-1), . . . l(1-7) are sequentially formed and in the second field of the first frame, nine lines . . . l(1-8), l(1-9), . . . l(1-16) are sequentially formed. In other words, one frame is shown to comprise 17 lines in all merely for the purpose of a simplified illustration. In the first line l(1-0), the number of sampled picture elements, is for example, five; in the next line l(1-1) of the first field, four sampled picture elements lie at positions displaced by one-half of the sampling period with respect to the line l(1-0); and in the next l(1-2), the number of sampled picture elements is five as was the case with the line l(1-0). In the subsequent lines, the numbers of sampled picture elements undergo changes corresponding to those described above.

In the odd field following the second field of the first frame, for example, in the first field of the second frame, eight lines l(2-0), l(2-1), . . . l(2-7) are shown formed one after another (FIG. 1B), and in the second field thereof, nine lines l(2-8), l(2-9), . . . l(2-16) are successively formed, so that again 17 lines exist in one frame. Since the number of lines is odd, the number of sampled picture elements and the phase of the color subcarrier are opposite to those in the first frame. In other words, if the number of sampled picture elements is five in one of the lines of the first or second frame, then the number on sampled picture elements in the line at the same position in the other of the frames will be four and the color subcarriers of the two lines are displaced apart in phase by $\pi$. A particular line and the line positioned one line therebelow in the previous field have the same number of sampled picture elements and the same phase of the color subcarrier. For example, if the line l(1-10) in the second field of the first frame contains an error, then the line l(1-2) which is positioned in the previous field one line below the line l(1-10) is a suitable interpolation line. The two lines l(1-2) and l(1-10) both have five sampled picture elements and have no phase difference between their color subcarriers. In all other cases, that is, any other line assumed to have an error and the respective interpolation line positioned one line therebelow in the next previous field, are equal in the numbers of sampled In the case of fs=4fsc, the correspondence between an erroneous line and the respective interpolation line is such that, for example, if the line l(1-10) is an erroneous line, then the line l(1-2) becomes the interpolation line, as will be evident from FIG. 2A (showing the first frame) and FIG. 2B (showing the second frame). In the case of fs=4fsc, the numbers of sampled picture elements in all of the lines are equal, for example, are shown to be five. If lines from l(1-0) to l(2-16) are error-containing lines, the respective interpolation lines are exactly as shown in Table 2, and each erroneous line and the respective interpolation line have the same phase of the color subcarrier.

As will be appreciated from the above, an erroneous section of a digitized color video signal can be concealed by being replaced with information having a number of sampled picture elements and phase relationship which is similar to the original. Moreover, such concealment can be performed whether the sampling frequency (fs) is fs=3fsc or fs=4fsc.

The interpolation method described above for concealing an error can be achieved with a random access memory (hereinafter referred to as RAM) which has a capacity larger than one field. Therefore, if the numbers of lines in each field are assumed to be as shown on FIGS. 1A, 1B and 2A, 2B, the RAM may have line addresses 1 to 9, as shown by the numbers at the left side of FIG. 3A. In FIGS. 3B to 3I, the line addresses 1 to 9 of the RAM are omitted for the sake of simplicity.

Figures 3A, 3B, 3C, 3D, 3E, 3F, 3G, 3H, 3I:
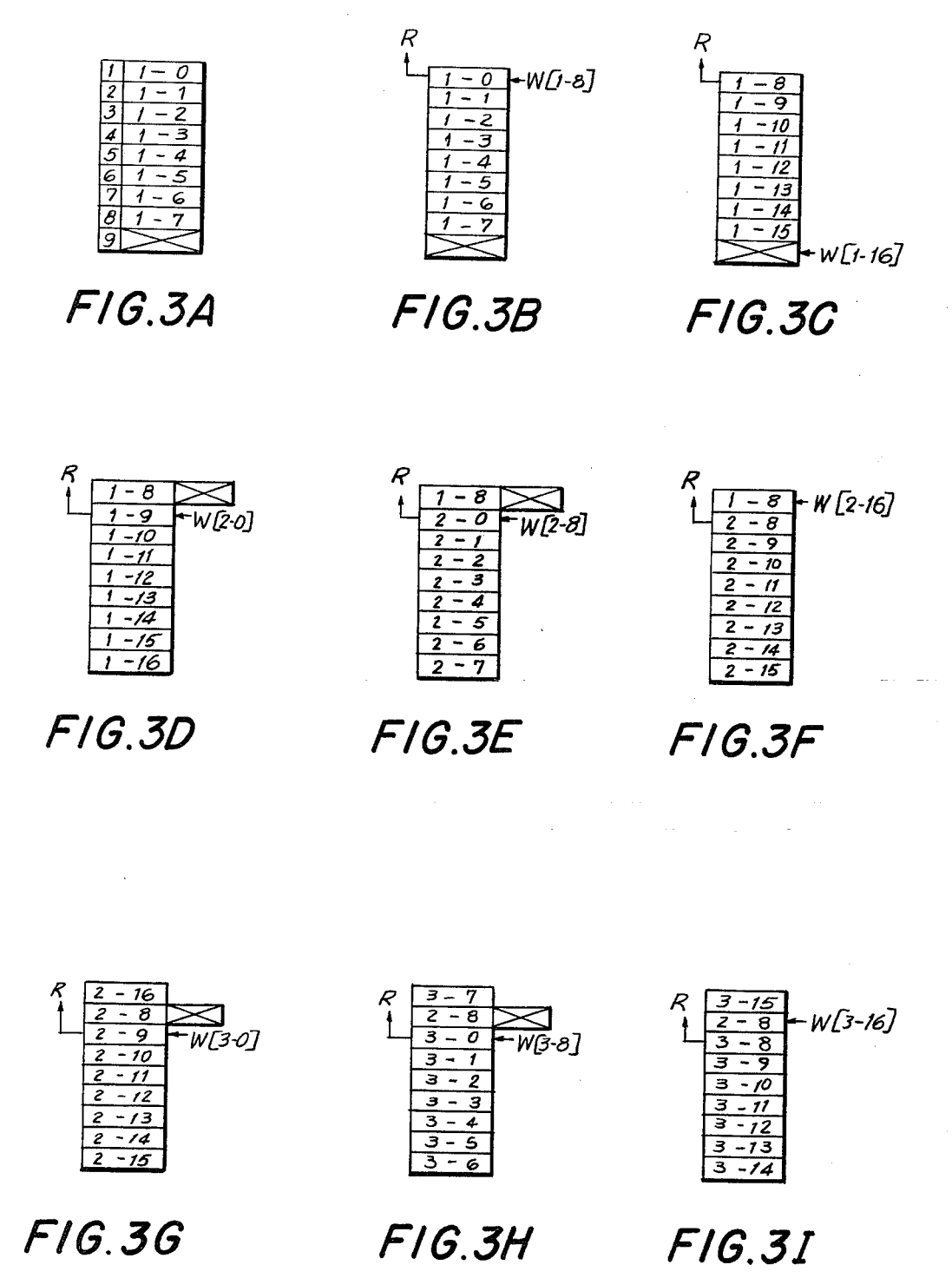

In the first field of the first frame, data of the field are sequentially written in the addresses 1 to 8 of the RAM. FIG. 3A indicates, by the notations [1-0]-[1-7], that the data of the lines (0) through (7) of the first field have been written at the addresses (1)-(8), respectively. Next, data of the line [1-8], that is, the first line of the second field, is written at the address (1) in which the data of the line [1-0] of the first field of the same frame had been stored, as depicted in FIG. 3B. The foregoing is a first condition that should be satisfied in writing data in the RAM. Prior to this writing of the line [1-8] at the address (1), the data of line [1-0] is read out from that address, that is, the first half of a memory cycle of the RAM is used as a read-out cycle and the later half is used as a write cycle. The data of the respective lines of the second field are sequentially written in the RAM, and the data of the last line [1-16] of the first frame is written in the address (9), as illustrated in FIG. 3C. In principle, the reading of data is performed at the address at which new data is to be written, as mentioned above. However, in the case of writing the data of the last line of the frame, for example, the line [1-16], the data stored in the address next to the address in which the data is to be written is read out.

As shown in FIG. 3D, in which writing of the data of the first frame has been completed, the data of the line [2-0] of the first field of the second or next frame is written in the address next to the address in which the data of the line [1-8] of the second field of the first frame has been stored. This is a second condition that should be satisfied in writing in the RAM. While following the above conditions concerning the writing and reading in the RAM, the operations proceed as shown in FIGS. 3E and 3F, and the writing of the data of all lines of the second frame is completed with the stored data in the RAM being as shown on FIG. 3G.

Then, the data of the first line [3-0] of the third frame is written while following the above described second condition, as shown in FIG. 3G, and further, the data of the line [3-8] that is, the first line of the second field of the third frame, is written, following the earlier described first condition, as depicted in FIG. 3H. Thus, the writing of the data of all lines of the third frame is completed, as shown in FIG. 3I. As will be understood from a comparison of FIGS. 3A, 3D and 3G, or of FIGS. 3B, 3E and 3H, the address at which the data of the leading line of each field is written is shifted by one address every time the frame changes. In other words, the RAM operates in a circulating manner. The capacity of the RAM may be only so much larger than one field as is necessary for it to perform such operation.

Generally, in accordance with this invention, data from a VTR, such as, its reproduced output, is supplied via an error correcting circuit to the RAM. When the reproduced data is erroneous and the error is uncorrectable by an error correcting circuit, the latter generates a flag signal indicating such fact. In response to the flag signal, writing of the corresponding erroneous data in the RAM is inhibited. With the RAM being activated as described above, the line of the previous field positioned 1H below the erroneous line can be read out as interpolation data to conceal the error merely by inhibition of the writing operation.

For example, in the case where the data of the line [2-1] is erroneous and uncorrectable, and hence a flag signal has been produced on the line [2-1], writing in the RAM of the data of the line [2-1] is inhibited in the next memory cycle represented in FIG. 3D. Accordingly, the data stored in this address is the data of the line [1-10] previously written. As illustrated in FIG. 3E, in the next memory cycle in which the data of the line [2-1] should be read out, the data of the line [1-10] is read out in place of the data of the line [2-1]. In other words, the line l(1-10) of the previous field lying one line below the erroneous and uncorrectable line l(2-1) becomes an interpolation line to conceal the error in the line [2-1].

When the fields have equal numbers of lines, it is sufficient merely to shift, by one line, the write address of the leading line of each new frame.

Figure 4:
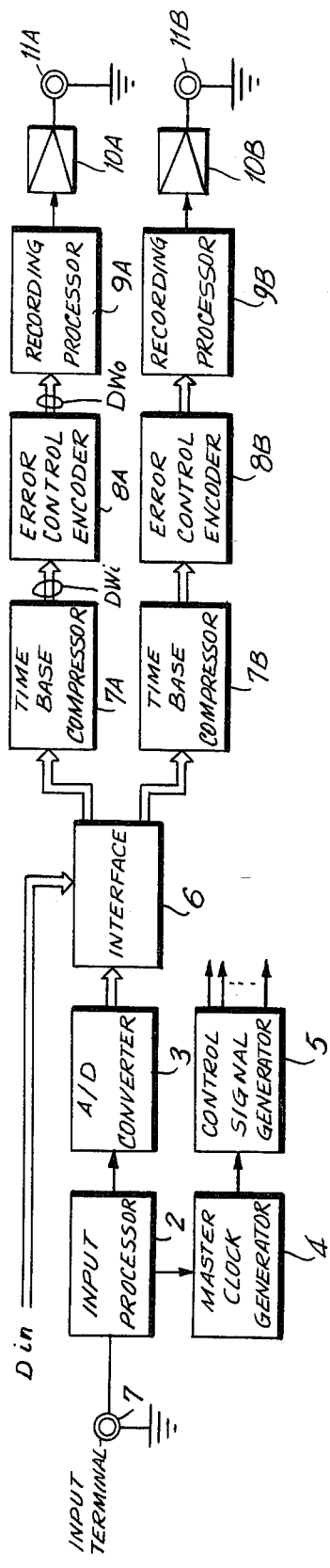
FIGS. 4 and 5 are block diagrams illustrating recording and reproducing sections, respectively, of a digital video tape recorder (VTR) embodying this invention.
Figure 5:
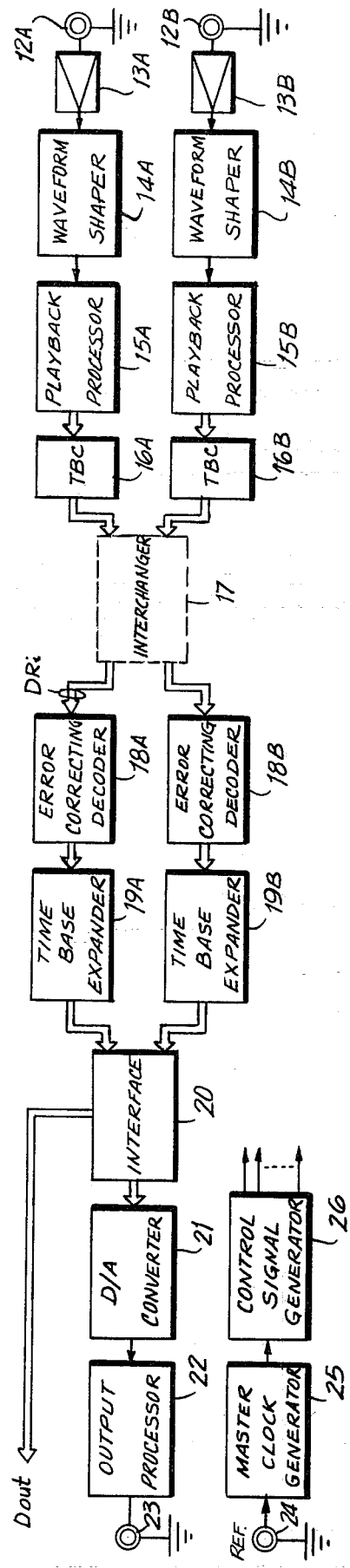

The present invention will hereinafter be described as being applied to a digital VTR made up of a recording section (FIG. 4) and a playback or reproducing section (FIG. 5). In the digital VTR, a digital video signal is recorded by a rotary head assembly (FIG. 6) in parallel tracks extending obliquely on a magnetic tape T (FIG. 8). Since the transmitting bit rate of the digital video signal is high, two rotary heads $H_A$ and $H_B$ (FIG. 7) are disposed in close proximity to each other, and the digital video signals of one field are distributed through two channels to such heads and recorded on the magnetic tape in two parallel tracks $T_A$ and $T_B$. An audio signal is also converted to a PCM (pulse code modulated) signal and recorded by a rotary head Hc in a third track Tc extending parallel to the video tracks $T_A$ and $T_B$ (FIG. 8).

Referring in detail to FIG. 4, it will be seen that an NTSC color video signal to be recorded is applied through an input terminal 1 to an input processor 2. The input processor 2 comprises a clamp circuit and a synchronizing and burst signal separator and supplies the effective or video information portion of the color video signal to an A/D converter circuit 3. A synchronizing signal and a burst signal separated from the color video signal by processor 2 are applied to a master clock generator 4 which is desirably of PLL (phase locked loop) construction. The master clock generator 4 generates clock pulses of the sampling frequency, for example, 3 fsc. The clock pulses from generator 4 and the synchronizing signal are applied to a control signal generator 5 which produces various kinds of timing pulses, identification signals (ID) for identifying lines, fields, frames and tracks, and a control signal, such as, a train of sampling pulses.

The A/D converter circuit 3 generally comprises a sample hold circuit and an A/D converter for converting each sampled output to an 8-bit code which is supplied, in parallel form, to an interface 6. The duration or period of one line (1H) of the NTSC color video signal is 63.5 μs and a blanking period therein is 11.1 μs. Accordingly, the effective video region or portion is 52.4 μs. When the sampling frequency is $$3fsc = \frac{3 \times 455}{2} fh,$$

the number of samples in one horizontal period is 682.5. Further, the number of samples in the effective video region or portion is 52.4 μs/Ts=526.7 samples, where Ts is the sampling period equal to 0.0931217 μs. In consideration of the division of the video information to be recorded into two channels, the number of effective video samples is selected to be 576 per line or horizontal period with 288 samples being assigned to each channel. As shown in FIG. 9, two horizontal periods (1365 samples) are considered as one unit, with the total number of samples in the line in which a horizontal synchronizing pulse HD and the color subcarrier are in phase with each other being selected to be 682 and the total number of samples in the line in which they are out of phase being selected to be 683.

The number of lines forming one field is 262.5H, with a vertical synchronizing period and an equalizing pulse period accounting for 10.5H. Since test signals VIT and VIR are inserted in the vertical blanking period, they are also regarded as effective video signals. Finally, the number of effective video lines in one field period is selected to be 252.

The digitized effective video region of the color video signal is divided by the interface 6 into two channels. Of the 576 samples in each line, data corresponding to the odd-numbered samples are assigned to one of the channels and data corresponding to the even-numbered samples are assigned to the other channel. The data of the two channels are processed in the same manner. An external digital video signal Din, for example, from an editing apparatus, may also be supplied to interface 6 to be suitably divided into two channels. The data in one of the channels is derived as a record signal for head $H_A$ at an output terminal 11A after being applied, in sequence, to a time base compression circuit 7A, an error control encoder 8A, a recording processor 9A and a recording amplifier 10A. The data in the other channel is also processed by the same arrangement, that is, by a time base compression circuit 7B, an error control encoder 8B, a recording processor 9B and a recording amplifier 10B, to provide a record signal for head $H_B$ at an output terminal 11B. The output terminals 11A and 11B are connected by way of a rotary transformer (not shown) to the rotary heads $H_A$ and $H_B$ disposed in close proximity to each other.

The code arrangement of each of the record signals respectively provided at the output terminals 11A and 11B will now be described with reference to FIG. 10. As there shown, a sub-block of the coded digital signal is composed of 105 samples (840 bits) in which a block synchronizing signal (SYNC) of three samples (24 bits), an identifying (ID) and address (AD) signal of two samples (16 bits), information data of 96 samples (768 bits) and CRC (Cyclic Redundancy Check) code of four samples (32 bits) are arranged one after another. The data of one line or horizontal period of the color video signal comprises 288 samples per channel, as previously mentioned, and these samples are divided into three, that is, there are three sub-blocks for each line, with 96 samples for each sub-block. The block synchronizing signal is used for identifying the beginning of a sub-block, whereupon the identifying and address signals, the information data and/or CRC code can be extracted. The identifying signals ID indicate the channel (track), the frame, the field and the line to which the information data of the sub-block belongs, and the address signal AD represents the address of the respective sub-block. The CRC code is used for the detection of an error in the information data of the respective sub-block.

Figure 11:
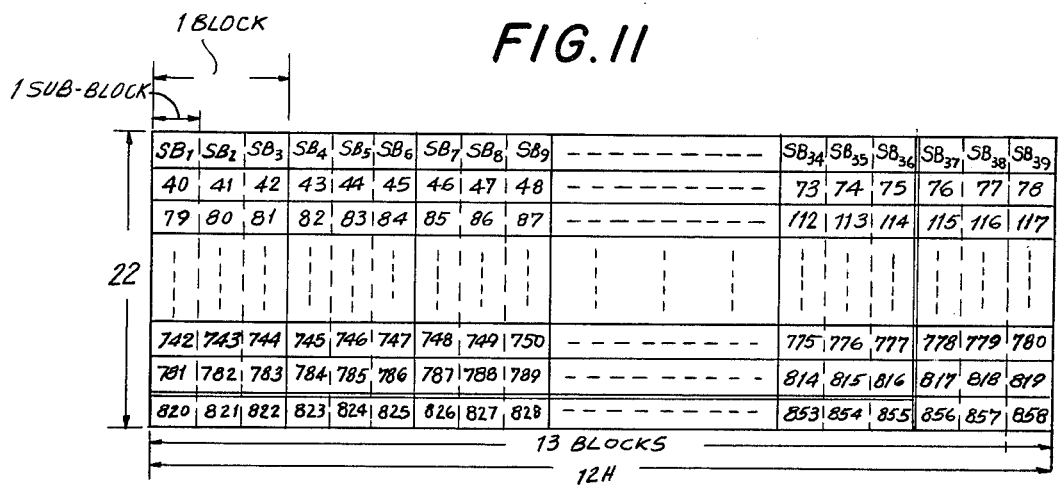

FIG. 11 shows the code arrangement for one field in one channel. In FIG. 11, each reference character SBi ($i=1\sim858$) indicates one sub-block, with three sub-blocks making up one block or line. Since the effective video region of one field is comprised of 252 lines, as mentioned previously, the data of 252 blocks (752 sub-blocks) exist in one field. The video information data of a particular field are sequentially arranged in a $21 \times 12$ matrix form. Parity data are also provided in connection with the horizontal and vertical directions, respectively, of the video information data in the matrix. More particularly, on FIG. 11, the parity data for the horizontal direction is shown positioned in the thirteenth column of blocks, and the parity data for the vertical direction is positioned in the twenty-second row at the bottom. In the thirteenth column of blocks at the twenty-second row is disposed the horizontal parity data for the vertical parity data. The parity data for the horizontal direction is formed in three ways by 12 sub-blocks respectively taken out of the 12 blocks forming one row of the matrix. In the first row, for example, parity data $SB_{37}$ is formed by the modulo 2 addition:

$$[SB_1] \oplus [SB_4] \oplus [SB_7] \oplus \ldots \oplus [SB_{34}] = [SB_{37}]$$

In the above, [SBi] means only the data in the respective sub-block SBi. In this case, samples belonging to respective ones of the 12 sub-blocks are each calculated in a parallel, 8-bit form. Similarly, by the modulo 2 additions:

$$[SB_2] \oplus [SB_5] \oplus [SB_8] \oplus \ldots \oplus [SB_{35}] = [SB_{38}]$$

$$[SB_3] \oplus [SB_6] \oplus [SB_9] \oplus \ldots \oplus [SB_{36}] = [SB_{39}]$$

parity data $[SB_{38}]$ and $[SB_{39}]$ are formed. The parity data is similarly formed for each of the second to twenty-second rows in the horizontal direction. Enhancement of the error correcting ability results from the fact that parity data is not formed merely by the data of the 36 sub-blocks included in a row, but is formed by the data of 12 sub-blocks positioned at intervals of two sub-blocks in the row.

The parity data for the vertical direction is formed by the data of 21 sub-blocks in each of the first to twelve columns of blocks. In the first column, parity data $[SB_{820}]$ is formed by the modulo 2 addition:

$$[SB_1] \oplus [SB_{40}] \oplus [SB_{79}] \oplus \ldots [WB_{781}] = [SB_{820}]$$

In this case, samples belonging to each one of the 21 sub-blocks are each calculated in a parallel 8-bit form.

Accordingly, these parity data comprise 96 samples as is also the case with the video data of each sub-block. In the case of transmitting the digital signal of one field of the above matrix arrangement ($22 \times 13$) as a series of first, second, third, ... twenty-second rows in sequence, since 13 blocks correspond to the length of 12H, a period of $12 \times 22 = 264H$ is needed for transmitting the digital signal of one field.

Incidentally, if the VTR is of the C-format type, and thus employs an auxiliary head for recording and reproducing one part of the vertical blanking period in one field, then a duration of only about 250H can be recorded with a video head. In accordance with the present invention, a duration of 246H, leaving a margin of several H's, has to be recorded in each track, that is, the period of 264H of data to be transmitted is time-base-compressed (with a compression ratio Rt of 41/44) to a period a duration of 246H. Further, a pre-amble signal and a post-amble signal, each having the transmitting bit frequency, are inserted at the beginning and the terminating end of the record signal of one field having the period of 264H.

The time base compression circuit 7 in FIG. 4 compresses the video data with the above-noted compression ratio 41/44 and provides a data blanking period in which the block synchronizing signal, the identifying and address signals and the CRC code are inserted for each sub-block of video data of 96 samples, and at the same time, sets up data blanking periods in which the blocks of the parity data are inserted. The parity data for the horizontal and vertical directions and the CRC code of each sub-block are generated by the error control encoder 8. The block synchronizing signal and the identifying and address signals are added to the video data in the recording processor 9. The address signal AD represents the previously noted number (i) of the sub-block. Further, in the recording processor 9 there are provided an encoder of the block coding type which converts the number of bits of one sample from 8 to 10, and a parallel-to-serial converter for serializing the parallel 10-bit code. As disclosed in detail in U.S. patent application Ser. No. 171,481 dated July 23, 1980 and having a common assignee herewith, the block coding is such that $2^8$ codes whose DC levels are close to zero are selected from $2^{10}$ codes of 10-bit and arranged to have one-to-one correspondence to the original 8-bit codes. By means of the foregoing, the DC level of the record signal is made as close to zero as possible, that is, "0" and "1" alternate with each other as much as possible. Such block coding is employed for preventing degradation of the transmitting waveform on the playback side by substantial DC free transmission. It is also possible to achieve the same results by employing a scramble system utilizing the so-called M-sequence which is substantially random in place of the block coding. In the case where each sample comprises 8 bits, the transmitting bit rate per channel is as follows:

$$(3\,fsc) \times 8 \times (\tfrac{1}{2}) \times (44/41) = 46.097 \text{ Mb/sec.}$$

After converting the above 8-bit code to the 10-bit code, the recording bit rate is as follows:

$$46.097 \times (10/8) = 57.62 \text{ MB/sec.}$$

In the reproducing or play back operation of the digital VTR according to this invention, the two channels of reproduced signals are derived from the heads $H_A$ and $H_B$ which scan tracks $T_A$ and $T_B$, respectively, corresponding thereto, and are applied to reproduced signal input terminals 12A and 12B, shown in FIG. 5. The reproduced signals are applied from terminals 12A and 12B through playback amplifiers 13A and 13B to waveform shaping circuits 14A and 14B, respectively. Each of the waveform shaping circuits 14A and 14B includes a playback equalizer for increasing the high-frequency component of the reproduced signal and shapes the reproduced signal to a clear pulse signal. Further, each waveform shaping circuit 14A or 14B extracts a reproducing bit clock synchronized with the pre-amble signal and supplies the reproducing bit clock to a respective playback processor 15A or 15B together with the data. In each of the playback processors 15A and 15B, the serial data is converted to parallel form, the block synchronizing signal is extracted, the data is separated from the block synchronizing signal and from the ID, AD and CRC codes or signals, and further, block decoding or 10-bit to 8-bit conversion is performed. The resulting data is applied to a respective time base corrector 16A or 16B in which any time base error is removed from the data. Each of the time base correctors 16A and 16B is provided with, for example, four memories, in which reproduced data are sequentially written by clock pulses synchronized with the reproduced data, and the data are sequentially read out from the memories, by reference clock pulses. When the reading operation is likely to get ahead of the writing operation, the memory from which the data has just been read is read again.

The data of each channel is provided from the respective one of the time base correctors 16A and 16B to one of the other of error correcting decoders 18A and 18B by way of a common interchanger 17. In an ordinary playback operation in which the rotary heads faithfully scan the recording tracks on the magnetic tape or in slow motion or still picture playback in which the rotary heads are controlled in position so that they faithfully follow the recording tracks respectively, signals are reproduced only from the tracks $T_A$ and $T_B$ corresponding to the two rotary heads $H_A$ and $H_B$ and supplied to the input terminals 12A and 12B, respectively. However, during high speed reproducing, in which the running speed of the magnetic tape is as high as several tens of times its ordinary speed, each of the rotary heads scans a plurality of recording tracks. As a result, signals reproduced from the tracks $T_A$ and $T_B$ are mixed together in the signals supplied to the input terminals 12A and 12B. In such a case, the interchanger 17 identifies the correct channels of the reproduced signals, using track identifying signals, and supplies the reproduced signals to the error correcting decoder 18A or 18B for the respective channel.

Each error correcting decoder 18A or 18B includes error detecting and correcting circuits using CRC, horizontal and vertical parities, a field memory and so on, as later described in detail. However, during high speed reproducing, no error detection and correction are carried out and the field memory is used instead for converting the intermittently received reproduced data of each channel into a continuous form. The data from each error correcting decoder 18A or 18B is applied to a respective time base expander circuit 19A or 19B, respectively, which returns the data to the original transmitting rate and then applies the data to a common interface 20. The interface 20 serves to return the reproduced data of the two channels into a single channel which includes a D/A converter circuit 21 for conversion of the data into analog form. From the interface 20 there may also be provided a digital video output Dout. Since a digital video input and a digital video output are provided in the recording and reproducing sections of FIGS. 4 and 5, editing and dubbing can be carried out with digital signals, that is, without conversion from and/or to analog form.

The output from the D/A converter circuit 21 is applied to an output processor 22, from which a reproduced color video signal is provided at an output terminal 23. An external reference signal is supplied from a terminal 24 to a master clock generator 25, from which clock pulses and a reference synchronizing signal are provided to a control signal generator 26. The control signal generator 26 provides control signals synchronized with the external reference signal, such as, various timing pulses, identifying signals for the line, field and frame, and sample clock pulses. In the reproducing section, the processing of the signals from input terminals 12A and 12B to the input sides of time base correctors 16A and 16B is timed by the clock pulse extracted from the reproduced data, whereas the processing of the signals from the output sides of the time base correctors 16A and 16B to the output terminal 23 is timed by the clock pulse from the master clock generator 25.

Before providing a more detailed description of the error correcting decoders 18A and 18B embodying the present invention, the encoding operation of the error control encoders 8A and 8B will be described with reference to FIGS. 12A-12D. In FIG. 12A, a timing pulse WDST is shown which indicates the beginning of a data section in one field and, in FIG. 12B, there is shown a parallel, 8-bit data series DWi supplied from the time base compression circuit 7A or 7B. The effective data in one field are contained in a total of 756

(=12×21×3) sub-blocks, and that data series DWi is shown to have a time slot in which to insert the CRC code following each sub-block and a time slot in which to insert horizontal parity data every 36 sub-blocks. The length of time encompassed by one horizontal row of 39 blocks, including 36 sub-blocks and the time slots for the insertion of the horizontal parity data corresponding thereto, is 12RtH or $$\left(12 \times \frac{41}{44} \times H\right).$$

FIG. 12C shows timing pulses HPT, VPT and CRCT which assume high levels "1" in the time slots in which the horizontal parity, the vertical parity and the CRC code, respectively, are to be inserted.

The data series DWi is applied to a conventional vertical parity generating circuit (not shown) and 36 vertical parity data [$SB_{820}$] to [$SB_{855}$] generated by this circuit are added, at the timing pulse VPT, to the delayed data series DWi. Next, the data series DWi including the vertical parity data is supplied to a conventional horizontal parity generating circuit (not shown), in which three horizontal parity data for the data series of one horizontal row are generated and added, at the timing pulse HPT, to the data series DWi. Then, the CRC code is added to the data series DWi in the period defined by the timing pulse CRCT to provide a data series DWo, as shown in FIG. 12D. As described previously, at the beginning of each sub-block of the data series DWi from the time base compression circuit or the data series DWo from the error control encoder 8, there is provided a time slot in which the block synchronizing signal and the identifying and address signals are added. In this way, a data period of 246H is provided in each field period of 262H (or 263H), and, after a data blank of 16H, the data of the next field starts. When the data series DWo and the accompanying block synchronizing and identifying and address signals are recorded and then reproduced, the arrangement of the resulting data series DRi (FIG. 14B) reproduced from the magnetic tape and applied to error correcting decoder 18A or 18B is the same as that of the data series DWo shown in FIG. 12D.

Figure 13:
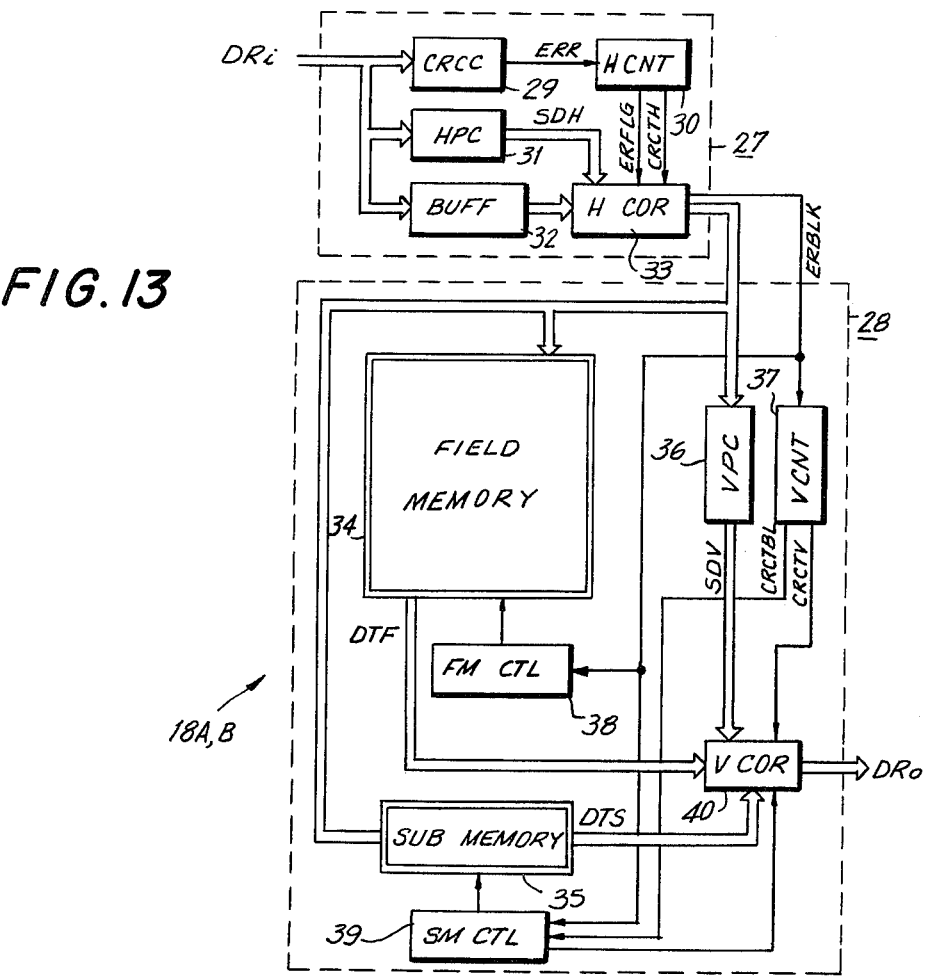
FIG. 13 is a block diagram of an error correcting decoder included in the reproducing section of FIG. 5.

Referring now to FIG. 13, it will be seen that each of the error correcting decoders 18A and 18B embodying the present invention generally comprises a horizontal section 27 for performing error detection and correction by the CRC code and the horizontal parity data, and a vertical section 28 for performing error detection and correction by the CRC code and the vertical parity data.

Figure 14:
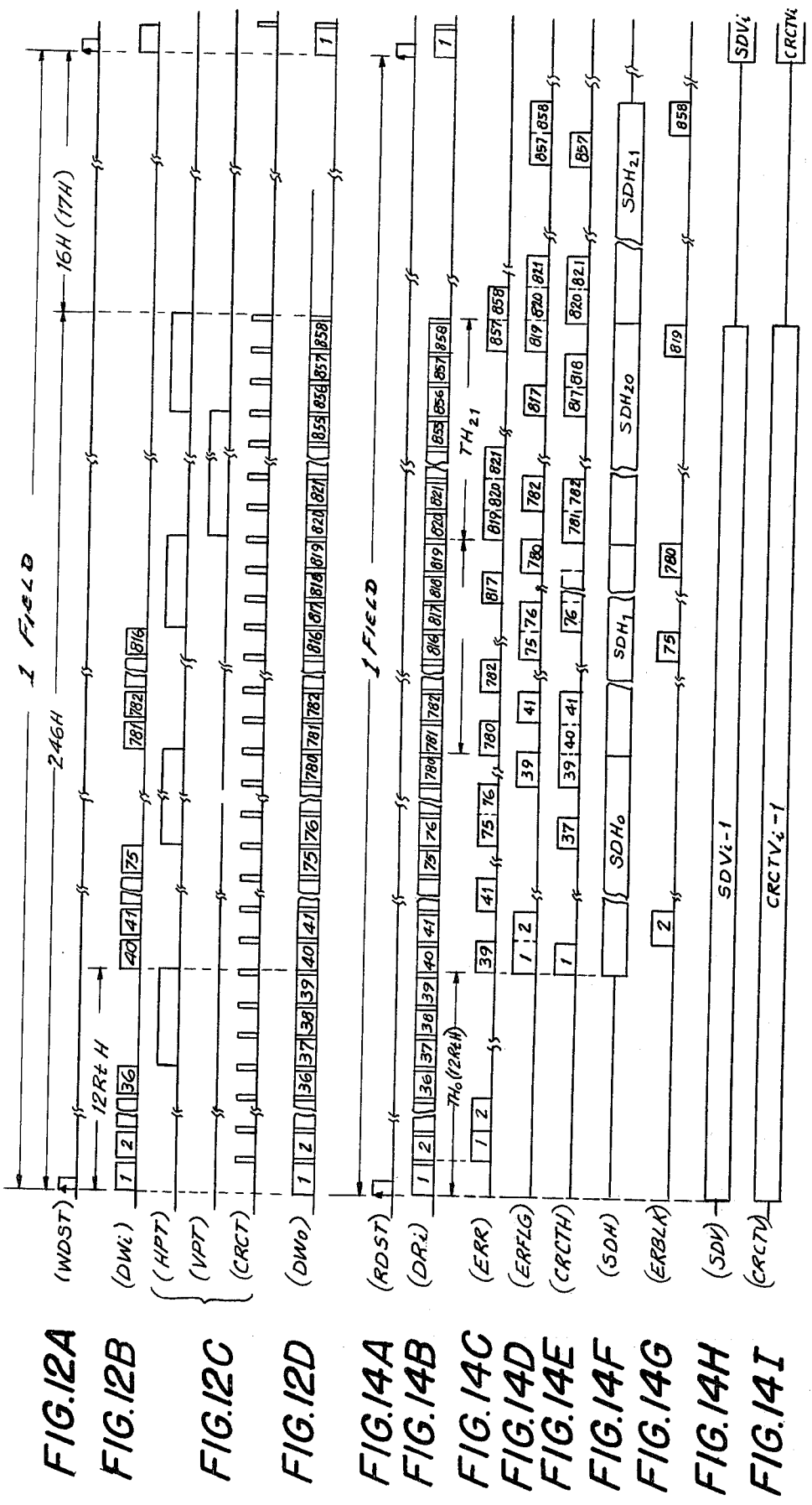
FIGS. 14A–14I are timing charts to which reference will be made in explaining the operation of the error correcting decoder of FIG. 13.

The parallel, 8-bit data series DRi (FIG. 14B), which is reproduced from the magnetic tape by the head $H_A$ or $H_B$ and passed through the waveform shaping circuit 14A or 14B, the playback processor 15A or 15B, and the time base corrector 16A or 16B, is supplied first to the horizontal section 27. A timing pulse RDST (FIG. 14A) defines the first timing of the data of one field. The data series Dri (FIG. 14B) includes in one field the period from a first horizontal row period $TH_0$ of the matrix (FIG. 11) to a twenty-second horizontal row period $TH_{21}$. A CRC checker 29 is shown to be included in horizontal section 27 and performs an error detection for each sub-block and yields an error signal ERR which is changed-over to the high level "1" only when an error is detected in the data series, and which is otherwise "0". All bits of each sub-block are checked for any error therein and, when even one bit is erroneous, the signal ERR is held at "1" for the period of the sub-block following the one containing the error (FIG. 14C). The error signal ERR is fed to a horizontal judging circuit 30. The horizontal judging circuit 30 delays the error signal ERR for a period corresponding to thirty-eight blocks to form an error flag ERFLG (FIG. 14D) and, as described later, produces for each sub-block a judging signal CRCTH (FIG. 14E) which indicates whether or not the error is correctable, with signal CRCTH being "1" when the error is correctable and "0" when the error is not correctable.

Further, the data series DRi is supplied to a horizontal parity checker 31 to derive therefrom a horizontal syndrome sequence SDH (FIG. 14F). The horizontal syndrome is calculated in one horizontal row period (12RtH) and held so that it may be used for an error correction in the next horizontal row period. In order to effect the foregoing, the horizontal parity checker 31 includes two parts which alternately perform the calculation of the horizontal syndrome and the holding of the calculated horizontal syndrome. In FIG. 14F, the horizontal syndromes for the data of the horizontal row period $TH_0$–$TH_{21}$ are indicated at $SDH_0$–$SDH_{21}$, respectively. Each horizontal syndrome SDHi repeats the same content every three sub-blocks.

The data series DRi is also applied to a buffer memory 32 in which it is delayed for one horizontal row period and then supplied to an error correcting circuit 33. The error correcting circuit 33 employs the horizontal syndrome SDHi to correct each sub-block indicated to contain an error (by the respective signal ERFLG being "1") which is further indicated to be correctable (by the respective signal CRCTH being "1"). The error flag ERFLG for the sub-block thus corrected is changed to "0" resulting in an error block signal ERBLK shown in FIG. 14G. The data of the sub-blocks for which the error block signal ERBLK is "1", for example, [$SB_2$], [$SB_{75}$], [$SB_{780}$], [$SB_{819}$] and [$SB_{858}$], are thereby shown to contain errors which have not been corrected by the horizontal parity.

The data sequence from the error correcting circuit 33 of horizontal section 27 is applied to a field memory 34, a sub-memory 35 and a vertical parity checker 36 which are included in the vertical section 28. Further, the error block signal ERBLK from horizontal section 27 is supplied to a vertical judging circuit 37, a field memory control circuit 38 and a sub-memory control circuit 39. In this case, since 66 sub-blocks composed of horizontal parity data are not used after the error correction in the horizontal or row direction, they are not stored in field memory 34. The 36 sub-blocks composed of vertical parity data are also not stored in memory 34. Accordingly, the field memory 34 need only have a capacity for 756 sub-blocks and the PCM data are written in the field memory 34 one after another with reference to the address signals of the respective sub-blocks.

In the writing of the PCM data in the field memory 34, the leading sub-block of each frame is shifted by three sub-block addresses corresponding to one line, and as described previously, each sub-block is written in the same address as the sub-block of the previous field positioned one line below the former in the pictorial representation of the complete frame. Each sub-block which has not been corrected in the horizontal section 27, that is, each sub-block for which the error block signal ERBLK is "1", is inhibited by the memory control circuit 38 from being written in the field memory 34. If each sub-block thus inhibited from being written in the field memory 34 is written in sub-memory 35 in response to the respective ERBLK signal monitored by the sub-memory control circuit 39 being "1", it is possible that, when many errors occur, the sub-memory 35 may overflow or, if the sub-memory 35 is arranged not to overflow, its capacity has to be very large.

In view of this, a detection signal CRCTBL is generated by the vertical judging circuit 37 and applied to the sub-memory control circuit 39. The vertical judging circuit 37 also generates, for each sub-block, a judging signal CRCTV (FIG. 14I) which is "1" when the error is correctable and "0" when the error is not correctable by the vertical parity, as described later. In the present embodiment, the vertical judging circuit 37 is designed so that while data of an ith field is supplied from horizontal section 27 to vertical section 38, the judging signal $CRCTV_{i-1}$ for the $(i-1)$ th-field preceding the ith field is provided. At the same time, it is detected whether or not the sub-block of the ith field whose error block signal ERBLK is "1" can be corrected by the vertical parity. In other words, when two or more of the 22 sub-blocks in the 36 columns in FIG. 8 are sub-blocks for which the error block signals ERBLK are "1", no error correction is possible, and, therefore, the detection signal CRCTBL is changed from "1" to "0". As a consequence, only those erroneous sub-blocks whose signals ERBLK and CRCTBL are both "1" are stored in the sub-memory 35. At the same time, the address of each of the sub-blocks written in the sub-memory 35 is stored as a vertical error flag SFLG, as later described. In order that during writing of the ith-field, the sub-block and the error flag SFLG stored as described above may be read out for correcting the error in the $(i-1)$ th-field by the error correcting circuit 40, each of the sub-memory 35 and the sub-memory control circuit 39 includes two parts for writing and reading, respectively, during a certain field period.

Since a sub-block in each channel includes 96 samples in parallel, 8-bit configuration, as described previously, the total number of bits of the PCM data of on field is 580608 ($=8\times96\times756$). Using the error rate (the probability of bit error) of the recording-reproducing system of the digital VTR as a parameter and assuming that errors do not center on the same block but scatter to each sub-block for one erroneous bit, the number of erroneous sub-blocks per channel in one field is as follows:

| Error rate | Number of erroneous sub-blocks |
| --- | --- |
| $10^{-2}$ | 5806.1 |
| $10^{-3}$ | 580.6 |
| $10^{-4}$ | 58.1 |
| $10^{-5}$ | 5.8 |
| $10^{-6}$ | 0.6 |

If it is assumed that the error rate of the actual recording-reproducing system is about $10^{-5}$, a capacity of sub-memory 35 corresponding to six sub-blocks will be sufficient in almost all cases. Since the writing in sub-memory 35 is controlled with reference to detection signal CRCTBL, as described previously, when two or more sub-blocks are erroneous in any one vertical column, only the first one of the erroneous sub-blocks is written in sub-memory 35 so that an overflow of the sub-memory 35 can be avoided in almost all cases.

The data of the previous field is read out from field memory 34 or sub-memory 35 and supplied to the error correcting circuit 40. In respect to each sub-block for which the vertical error flag SFLG is stored, the data from sub-memory 35 is given priority over the data from field memory 34 in being supplied to correcting circuit 40. For all other sub-blocks, the data from the field memory 34 is supplied to circuit 40. Correctable errors remaining in the data applied to vertical section 28 are corrected by the data from the sub-memory 35 and the vertical syndrome sequence SDV (FIG. 14H).

Each part of the above briefly described error correcting decoder 18A or 18B will now be described in greater detail, starting with reference to FIG. 15 which relates to the horizontal judging circuit 30 supplied with the error signal ERR from the CRC checker 29 to provide the error flag ERFLG and the judging signal CRCTH.

Figure 15:
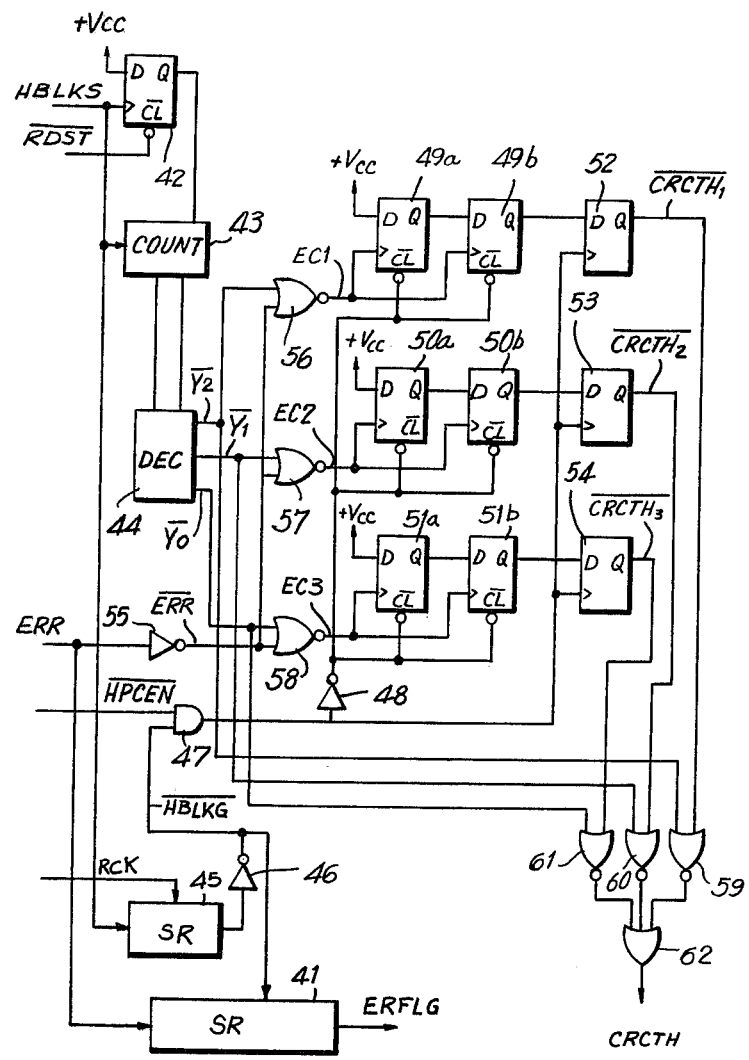
FIG. 15 is a block diagram of a horizontal judging circuit that is included in the error correcting decoder of FIG. 13.

More particularly, FIG. 15 illustrates the construction of one of the two parts of circuit 30 which operate alternately at every horizontal row period. As shown, the error signal ERR is delayed by a shift register 41 for a period corresponding to 38 blocks, thereby to generate the error flag ERFLG.

The judgement as to whether error correction by the horizontal parity is possible or not is carried out in the following manner: Since one horizontal row forms three error correcting block codes each of which comprises twelve data sub-blocks every three blocks and one horizontal parity sub-block, one horizontal row is processed as three equivalently independent rows to detect how many sub-blocks are erroneous in each of the three rows. When two or more sub-blocks are erroneous, the judgement is made that the error correction is impossible. A D-type flip-flop 42, a counter 43 and a decoder 44 derive from timing pulses HBLKS (FIG. 16B) of the sub-block period synchronized with the data series DRi, gate pulses $\overline{Y}_2$, $\overline{Y}_1$ and $\overline{Y}_0$ (FIG. 16C) corresponding to the respective sub-blocks in one block. More particularly, a timing pulse RDST (FIG. 16A) indicates the beginning of the data section of the data series DRi of each field and, in the period in which timing pulse RDST is "1", D-type flip-flop 42 is cleared and the timing pulses HBLKS (FIG. 16B) synchronized by the D-type flip-flop 42 with the data series RDi are applied as load pulses to the counter 43. Thereafter, counter 43 counts the timing pulses HBLKS and the output from the counter 43 is decoded by decoder 44 to generate the three-phase gate pulses $\overline{Y}_2$, $\overline{Y}_1$ and $\overline{Y}_0$ shown in FIG. 16C. The gate pulse $\overline{Y}_2$ becomes "0" for a period corresponding to a first sub-block of each block; the gate pulse $\overline{Y}_1$ becomes "0" for a period corresponding to the next sub-block; and the gate pulse $\overline{Y}_0$ becomes "0" for a period corresponding to the third sub-block of each block.

The data series DRi shown in FIG. 16D indicates the starting parts of the first, second and third horizontal row periods $TH_0$, $TH_1$ and $TH_2$ of a certain field. A pulse $\overline{HPCEN}$ is obtained by inverting a timing pulse HPCEN shown in FIG. 16F which becomes "0" at the end of one horizontal row of this data, and a timing pulse $\overline{HBLKG}$ (FIG. 16E) is provided by delaying the timing pulse HBLKS through a shift register 45 (using a sample clock pulse RCK as a shift pulse) and by inverting the output through an inverter 46. The pulses $\overline{HPCEN}$ and $\overline{HBLKG}$ are applied to an AND gate 47, and the output from the AND gate 47 is inverted by an inverter 48. D-type flip-flops 49a, 49b, 50a, 50b, 51a and 51b are cleared for each horizontal row period by the inverted output of gate 47. Flip-flops 52, 53 and 54 are provided at the output sides of the pairs of flip-flops 49a and 49b, 50a and 50b, and 51a and 51b, and the output of AND gate 47 is used as a clock pulse for flip-flops 52, 53 and 54. At the end of each horizontal row period, the outputs from flip-flops 49b, 50b and 51b are transferred to flip-flops 52, 53 and 54 and immediately thereafter flip-flops 49a, 49b, 50a, 50b, 51a and 51b are cleared.

FIG. 16G shows a signal $\overline{ERR}$ obtained by inverting the error signal ERR from CRC checker 29 by an inverter 55. The error signal $\overline{ERR}$ is supplied to NOR gates 56, 57 and 58 and distinguished by the gate pulses $\overline{Y}_2$, $\overline{Y}_1$ and $\overline{Y}_0$. Output pulses EC1 (FIG. 16H) from NOR gate 56 are used as clock pulses for flip-flops 49a and 49 b; output pulses EC2 from NOR gate 57 are used as clock pulses for flip-flops 50a and 50b; and output pulses EC3 from the NOR gate 58 are used as clock pulses for flip-flops 51a and 51b. To the input of each of flip-flops 49a, 50a and 51a is always applied a level "1" (+Vcc). As shown in FIG. 16G, the error signal $\overline{ERR}$, in the case of sub-blocks [SB$_1$], [SB$_4$], [SB$_{41}$], [SB$_{42}$] and [SB$_{78}$] containing errors, is separated by gate pulses $\overline{Y}_2$, $\overline{Y}_1$ and $\overline{Y}_1$ into error pulses EC1, EC2 and EC3 (FIG. 16H) of the three equivalent horizontal rows. In the horizontal row period TH$_0$, two error pulses EC1 are derived from NOR gate 56 only, so that, at the end of the period TH$_0$, the output from flip-flop 49b becomes "1" and the outputs from the other flip-flops 50b and 51b are "0", and these outputs are stored in flip-flops 52, 53 and 54 at the next stage. Accordingly, the signals respectively held in flip-flops 52, 53 and 54 are indicated at $\overline{CRCTH1}$, $\overline{CRCTH2}$ and $\overline{CRCTH3}$ in FIG. 16I. In the next horizontal period TH$_1$, only the signal $\overline{CRCTH1}$ becomes "1". The outputs from flip-flops 52, 53 and 54 are respectively applied to NOR gates 59, 60 and 61 together with the gate pulses Y$_2$, Y$_1$ and Y$_0$ (FIG. 16C), and the outputs from NOR gates 59, 60 and 61 are fed to an OR gate 62 to derive therefrom a judging signal CRCTH (FIG. 16J).

In the above way, the judging signal CRCTH is made to be "1" or "0" in dependence on whether the erroneous sub-block is correctable or not, respectively, by the horizontal parity.

Referring now to FIG. 17, it will be seen that the horizontal parity checker 31 there illustrated is provided with two parts which alternate, at every horizontal row period, in performing a horizontal syndrome calculating operation and a horizontal syndrome holding operation, respectively. The two parts of checker 31 respectively comprise adders 64A and 64B, which may be formed by exclusive OR gates and each of which adds together the parallel 8-bit series DRi and a fed-back parallel 8-bits data series DR$_1$' in accordance with the algorithm of (mod. 2). Parallel, 8-bit-input RAMs 65A and 65B respectively receive, as data inputs, the outputs from the adders 64A and 64B and latch circuits 66A and 66B are respectively supplied with the output data from the RAMs 65A and 65B. The contents of latch circuits 66A and 66B are alternately selected or read out by a multiplexer 67 every horizontal row period to form the horizontal syndrome sequence SDH.

Each of the RAMs 65A and 65B has a capacity capable of storing data (288 samples) of three sub-blocks and their addresses are sequentially changed from 0 to 287 by clock pulses RCK (FIG. 18A) of the sampling period. The RAMs 65A and 65B are cleared by a clear pulse PSACL (FIG. 18B) which becomes "0" at every three sub-blocks of the data series DRi. As described above, a sub-block of the data series DRi includes data of 96 samples, block synchronizing signals, address signals and identifying signals of five samples preceding the data and CRC codes of the four samples following the data. In the data blanking period between the sub-blocks, the supply of the sample clock RCK to the address counter is stopped to prevent stepping of the address, and the contents of RAMs 65A and 65B are repeatedly read out. FIG. 18C shows variations in the addresses ADR of the RAMs 65A and 65B. In the first horizontal row period TH$_0$ of a certain field, the read control signal $\overline{WE}$ (FIG. 18D) applied to RAM 65A causes it to operate in the mode shown in FIG. 18E in which the hatched sections W represent write cycles and the sections R represent read cycles. In the horizontal row period TH$_0$, the control signal WE (FIG. 18F) applied to RAM 65B is in the state "1", so that no data is written in the RAM 65B. In this period TH$_0$, the output from latch circuit 66B is selected by multiplexer 67, but since this is the first horizontal row period, no effective syndrome is available from latch circuit 66B. Further, sample clock pulses $\overline{RCK}$ are applied as latch pulses to latch circuits 66A and 66B, and the data read out from RAMs 65A and 65B are sequentially taken in by the latch pulses $\overline{RCK}$ in the latch circuits 66A and 66B. However, latch circuits 66A and 66B are respectively supplied with timing pulses HPCENA and HPCENB (FIGS. 16M and 16N) which act as clear pulses therein. These timing pulses HPCENA and HPCENB become "0" alternately with each other in the period of first three sub-blocks of successive horizontal row periods TH$_i$ of the field. When either of the timing pulses HPCENA and HPCENB is "0", the latch circuit 66A or 66B, respectively, is held in its cleared state and the 8-bit output DRi' therefrom is "0" in all bits. As a consequence, the first three sub-blocks in each horizontal row period are written in the RAMs 65A and 65B without any change though applied via the adders 64A and 64B.

In the presently described embodiment, data of 288 samples contained in the first three sub-blocks SB$_1$, SB$_2$ and SB$_3$ in the horizontal row period TH$_0$ are written, without change, in addresses 0 to 287 of RAM 65A. In the data blanking period between the sub-blocks SB$_3$ and SB$_4$, the address 0 remains unchanged and hence no write operation takes place. Also in the period in which the next three sub-blocks SB$_4$, SB$_5$ and SB$_6$ of data series DRi are sequentially supplied, the address of RAM 65A similarly changes from 0 to 287 in a sequential order. As is evident from the mode shown in FIG. 18E, the read cycle for each address precedes the write cycle, and parallel, 8-bit data of one sample read out prior to the writing question is loaded or taken in the latch circuit 66A and fed back as an input DRi' to adder 64A. For example, in the addresses 0 to 95 of RAM 65A, there has been stored data of 96 samples of the sub-block SB$_1$, and in the period in which the data of one sample is read out from each of the addresses 0 to 95, a respective sample of the sub-block SB$_4$ is supplied as the input data series DRi. In other words, in the adder 64A, the corresponding samples of the sub-blocks SB$_1$ and SB$_4$ are added together in a parallel, 8-bit form and the results of such additions are rewritten in the addresses 0 to 95 of RAM 65A.

When the sub-blocks $SB_1$ to $SB_{39}$ forming one horizontal row have all been supplied by repeating the above operation, there is stored in the RAM 65A a syndrome $SDH_0$ concerning the first horizontal row. More particularly, in the addresses 0 to 95 of RAM 65A, there are stored the results of additions of the corresponding samples of the sub-blocks $SB_1$, $SB_4$, $SB_7$, ... $SB_{34}$ and $SB_{37}$; in the addresses 96 to 191 of RAM 65A, there are stored the results of additions of the corresponding samples of sub-blocks $SB_2$, $SB_5$, $SB_8$, ... $SB_{35}$ and $SB_{38}$; and in the addresses 192 to 287 of RAM 65A, there are stored the results of additions of the corresponding samples of the sub-blocks $SB_3$, $SB_6$, $SB_9$, ... $SB_{36}$ and $SB_{39}$. If the samples of the syndrome $SDH_0$ are all "0", then it is indicated thereby that the data in the first horizontal row is not erroneous; conversely, if even one of the eight bits forming of the syndrome is "1", then it indicates that the data includes an error. When only one of the thirteen sub-blocks constituting each of the three error correcting block codes is erroneous, the error can be corrected by the modulo 2-addition of the erroneous sub-block and the part of the syndrome $SDH_0$ corresponding to the erroneous sub-block.

In the next horizontal row period $TH_1$, since the write control signal $\overline{WE}$ (FIG. 18D) for the RAM 65A is "1", only the read-out operation of the RAM 65A is repeatedly effected, as depicted in FIG. 18E. At the same time, the multiplexer 67 is made to select the output from latch circuit 66A by the select signal SHSL (FIG. 16L) for the multiplexer 67 being "0". The syndrome $SDH_0$ thus read out from RAM 65A is made synchronous by the sample clock $\overline{RCK}$ applied to latch circuit 66A and is derived at the output by way of multiplexer 67, as depicted in FIG. 18H. The address ADR is again made to vary from 0 to 286, as shown in FIG. 18C, and is synchronized with the data series DRi delayed by the buffer memory 32 for one horizontal row period.

In the horizontal row period $TH_1$, the write control signal $\overline{WE}$ (FIG. 18F) applied to RAM 65B, causes repeated alternation of the read and the write cycles of RAM 65B. Accordingly, the syndrome $SDH_1$ for the second horizontal row composed of the sub-blocks $SB_{40}$ to $SB_{78}$ is calculated. When the select signal SHSL is "1" in the next horizontal row period $TH_2$ (FIG. 16L) the syndrome $SDH_1$ is read out from the RAM 65B via latch circuit 66B and multiplexer 67. By repeating such operations, syndromes $SDH_0$ to $SDH_{21}$, respectively, for 22 horizontal rows of one field are all obtained.

The buffer memory 32 is provided to hold the input data series DRi in its waiting state while the CRC checker 29 detects an erroneous block and the horizontal parity checker 31 forms the horizontal syndrome sequence SDH, as described above.

Since the cycle time of the RAMs in checker 31 is slower than the transmission speed of the input data series DRi, parallel, 4-sample (32-bit) processing is performed. The data (96 samples) in each sub-block and the address and identifying signal (two samples) preceding the data are delayed by the buffer memory 32. Since the total number of samples in this case is 98, which is not a multiple of four samples, they are processed as 100 samples including, as dummies, two samples in the part of the CRC code. More particularly, as shown on FIG. 19, first two samples of the input data series DRi are latched in one latch circuit 68A at the input side of buffer memory 32. Then, the next two samples are latched in another latch circuit 68B, by which the input data series DRi is converted to parallel, 4-sample form. The two samples latched in latch circuit 68A are written in a RAM 69A, and the two samples in latch circuit 68B are written in a RAM 69B. If it is assumed that one sub-block includes 100 samples, then one horizontal row of the matrix includes 3900 samples. The total capacity of the RAMs 69A and 69B is selected so that the RAMs can store the data of at least one horizontal row. The RAMs 69A and 69B are each supplied with the data in parallel, 2-sample form, and the address of each of these RAMs is sequentially varied from 0 to 974 every 4-sample period. When first and second samples of a certain sub-block are latched in latch circuit 68A, two samples of the previous horizontal row are read out from the address 0 of the RAM 69A and latched in a latch circuit 70A at the output side, and when the third and fourth samples are latched in latch circuit 68B, the first and second samples are written in the address of RAM 69A. The other RAM 69B is adapted to perform a read operation during the write cycle of RAM 69A and a write operation of RAM 69B is performed during the read cycle of RAM 69A. In other words, the RAM 69B conducts the same operations as the RAM 69A, but delayed by two samples of the input data series DRi.

The four samples, alternately read out from the RAMs 69A and 69B and latched in corresponding latch circuits 70A and 70B are taken out one-by-one in a sequential order and applied to one input of a modulo-2 adder 71 which forms the error correcting circuit 33. To the other input of adder 71 is applied the horizontal sequence SDH generated by horizontal parity checker 31. In the illustrated embodiment, the syndrome sequence SDH is provided to adder 71 by way of a delay circuit 72, for example, in the form of a shift register, and a gate circuit 73 for effecting phase synchronization of the syndrome sequence with the data series. The delay circuit 72 also receives a timing pulse HBLKE as a clear pulse. The timing pulse HBLKE is similar to the timing pulse HBLKS (FIG. 16B) and inhibits ineffective data of the syndrome which occur in the data blanking period between sub-blocks. In other words, during the data blanking period, the syndrome is converted so that all its bits may become "0", thereby preventing any change in the identifying and address signal included in the data series from the buffer memory when applied to the adder 71.

The gate circuit 73 is provided to supply only the syndrome corresponding to a sub-block containing a correctable error. The gate circuit 73 is controlled on the basis of the judging signal CRCTH formed by the horizontal judging circuit 30 and the error flag ERFLG. Four combinations of the values "1" and "0" of signals CRCTH and ERFLG mean the following:

(1) CRCTH="0", ERFLG="0": The sub-block is contained in an uncorrectable horizontal row, but the sub-block itself does not contain an error. Accordingly, the gate circuit 73 is OFF.

(2) CRCTH="0", ERFLG="1": The sub-block is contained in an uncorrectable horizontal row, and is itself erroneous. Accordingly, the gate circuit 73 is OFF.

(3) CRCTH="1", ERFLG="0": The sub-block is contained in a correctable horizontal row, but is not erroneous. Accordingly, the gate circuit 73 is OFF.

(4) CRCTH="1", ERFLG="1": The sub-block is contained in a correctable horizontal row, and the sub-block contains an error. In this case only, the gate circuit 73 is turned ON and the error is corrected by the modulo-2 adder 71.

The output from the gate circuit 73 is "0" in all bits when in its OFF state, and, so long as gate circuit 73 is in its OFF state, the data applied to adder 71 does not change.

In order to achieve the above, the judging signal CRCTH and the error flag ERFLG are provided to an AND gate 74, and when the output of the latter becomes "1", gate circuit 73 is turned ON. Further, a judging signal $\overline{\text{CRCTH}}$ obtained by inverting the signal CRCTH by means of an inverter 75 and the error flag ERFLG are applied to an AND gate 76 to derive therefrom the error block signal ERBLK which becomes "1" for a sub-block which is erroneous but uncorrectable by the horizontal parity.

It will easily be understood that the components of the horizontal section 27 described above with reference to FIGS. 15–19 perform the error correcting operations earlier described with reference to FIGS. 14A–14G.

Next, a more detailed description will be given of illustrative embodiments of various parts of the vertical section 28 of the error correcting decoder 18A or 18B according to this invention. The vertical parity checker 36 can be implemented in a manner similar to that of horizontal parity checker 31. A vertical syndrome SDVi of 96×36=3456 samples is formed by the modulo-2 addition, in a parallel, 8-bit form, of the corresponding samples of 22 sub-blocks included in each of first to thirty-sixth columns in the code arrangement of FIG. 11. To perform the foregoing, at a time when a sub-block included in a certain column is being supplied to the vertical parity checker 36, the input sub-block data and the read out sub-block data from the same column but the immediately preceding horizontal row period are calculated by modulo-2 additions, and the results of such calculation are written at the same address. For example, at the same time of supplying the sub-block $SB_{79}$ to the vertical parity checker 36, $[SB_1] \oplus [SB_{40}]$ is calculated as read-out data together with input data and the results of calculation $[SB_1] \oplus [SB_{40}] \oplus [SB_{79}]$ are written at the same address. Such read and write operations for the same address are carried out for each address of a horizontal row (36 sub-blocks) sequentially and this is repeated for each of 22 horizontal rows. After this, in a RAM (not shown) of the vertical parity checker 36 are formed and stored vertical syndromes respectively corresponding to first to thirty-sixth columns. As is the case with the horizontal parity checker 31, a vertical syndrome formed in a certain field period is held in the next field period. Further, similarly to the horizontal parity checker 31, the vertical parity checker 36 is provided with two sections which respectively perform the vertical syndrome forming operation and the vertical syndrome holding operation, alternately. Thus, the vertical syndromes which are alternately held form a syndrome sequence SDV as depicted in FIG. 14H.

As shown in FIG. 14H, the vertical syndrome sequence SDV from vertical parity checker 36 is synchronized with the input data series DRi (FIG. 14B) applied to the horizontal section 27, but is delayed for one field period relative to the input data series DRi. The data series supplied from horizontal section 27 to vertical section 28 has been delayed for one horizontal row period relative to the input data series DRi and is further delayed by the field memory 34 (or the sub memory 35) in the vertical section. Of course, for proper operation of the error correcting circuit 40, the data series and the syndrome sequence SDV have to be applied thereto in synchronization with each other.

Figure 20:
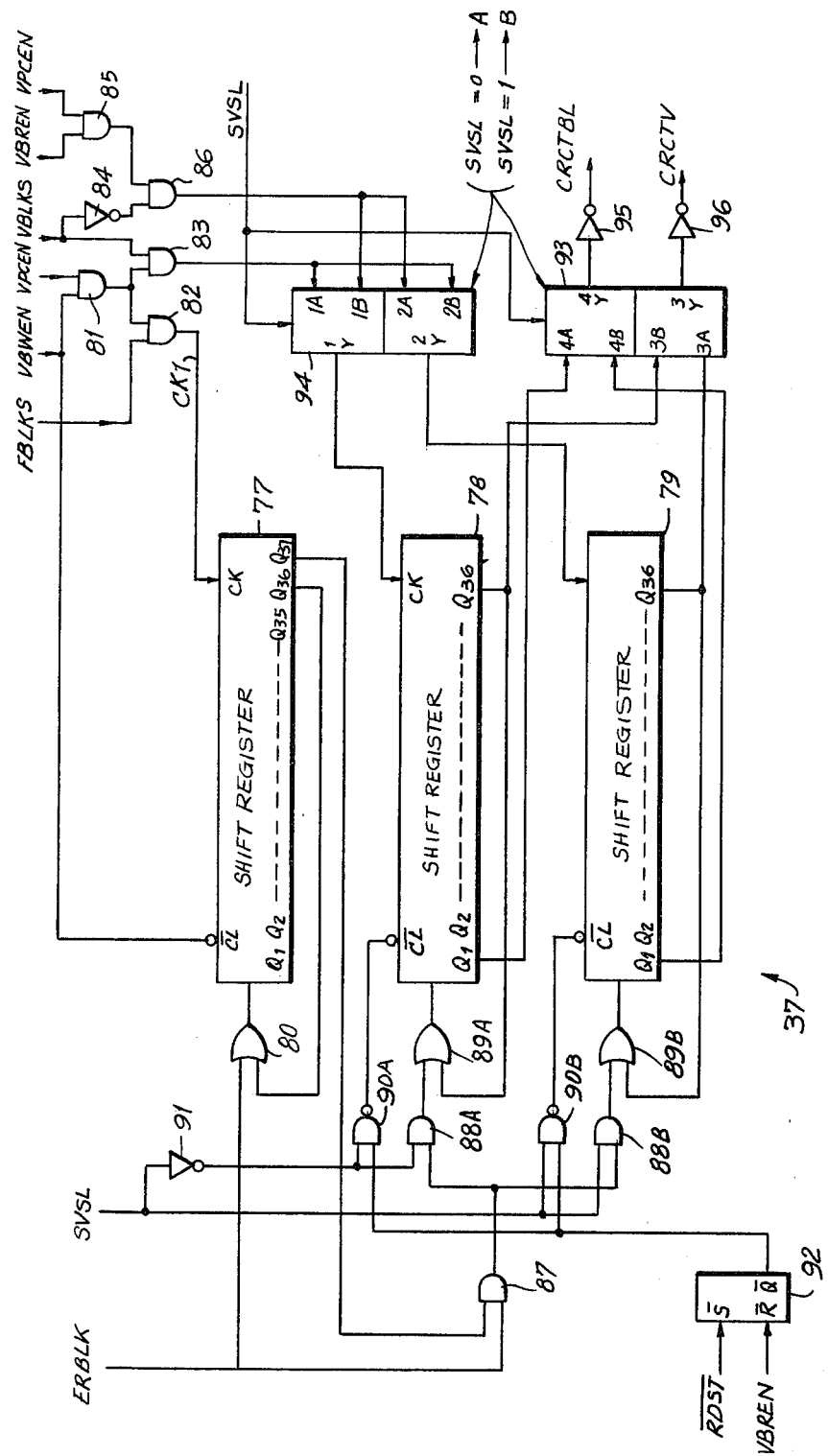
FIG. 20 is a block diagram showing a vertical judging circuit included in the error correcting decoder of FIG. 13.

FIG. 20 illustrates a suitable arrangement of the vertical judging circuit 37 which, in respect to the data supplied to the vertical section 28, counts the number of erroneous sub-blocks in each column direction and yields a detection signal CRCTBL which is "0" for indicating that the error cannot be corrected in the case of two or more erroneous sub-blocks being contained in a column, or which is "1" for indicating the correctability of the error. Further, the vertical judging circuit 37 generates, as a final result of such detection, a judging signal CRCTV in the next field period. For achieving the foregoing function, it is possible to detect the number of error block signals ERBLK for each column by means of 36 counters each of which is supplied with the error block signals ERBLK for a respective one of the first to thirty-sixth columns. However, it is uneconomical to use as many as thirty six counters. Accordingly, in the embodiment of FIG. 20, the above-described function is performed by three shift registers 77, 78 and 79.

In order that the following description of the vertical judging circuit 37 may be readily understood, various timing signals and control signals for processing in the vertical section 28 will first be described with reference to FIGS. 21A–21K.

More particularly, a timing pulse RDST (FIG. 21A) having a field period is synchronized with the beginning of data of each field in the data series DRi and DRo. This pulse RDST defines a certain field TVi, the next field TVi+1 and so forth. A field switching pulse SVSL (FIG. 21B) is switched between "0" and "1" every field in synchronization with the timing pulse RDST. A timing pulse VPCEN (FIG. 21C) has a period of one horizontal row period TH and becomes "0" in a period corresponding to the horizontal parity data. A timing pulse VBREN (FIG. 21D) indicates a period for reading out the data from the field memory 34 and a period for executing the correction of a correctable erroneous block by means of the vertical syndrome SDV. A pulse VBENT (FIG. 21E) indicates the period in which the data series is transferred from the horizontal section 27 to the vertical section 28. A timing pulse VBWEN (FIG. 21F) corresponds to the pulse VBENT, but is expanded to include the vertical parity data. The data series DATA.SEQ (FIG. 21G) from horizontal section 27 includes horizontal parity data shown as a hatched region for the data of each horizontal row of the periods $TH_1$ to $TH_{22}$ and vertical parity data in the twenty-second horizontal row. Each sub-block of the data reproduced from the magnetic tape includes 105 samples, as mentioned previously, but the data period of each field is reduced from 246H to about 243H since the buffer memory 32 processes each sub-block as 100 samples (two of which are dummies), as mentioned previously. Only 96 samples of data are written at the address in field memory 34 corresponding to a 10-bit address signal included at the beginning of a sub-block. However, in vertical section 28, the horizontal and vertical parity data are not corrected, so that such parity data are not written in the field memory 34 or in the sub-memory 35.

Since vertical parity checker 36 has two parts similar to the two parts of the horizontal parity checker 31 described above with reference to FIG. 17, a latch clear pulse $\overline{\text{PBCLA}}$ (FIG. 21H) is provided to clear one of the latch circuits of checker 36 corresponding to the latch circuits 66A and 66B of checker 31. A latch clear pulse $\overline{PBCLB}$ (FIG. 21I), obtained by shifting the pulse $\overline{PBCLA}$ by one field period, is provided to clear the other of the latch circuits of vertical parity checker 36.

In the vertical parity checker 36, one latch circuit generates a syndrome while the pulse $\overline{PBCLA}$ assumes a high level "H" in the field period TVi and holds the syndrome SDVi for a corrective calculation in the next field period TVI+1, and the other latch circuit holds a previously formed syndrome SDVi+1 in the field period TVi and again calculates a syndrome while the pulse $\overline{PBCLB}$ takes a high level "H" in the next field period TVi+1. Accordingly, the vertical syndrome sequence SDV employed for the corrective calculation is illustrated in FIG. 21J. Further, the data series DRo (FIG. 21K) derived from the correcting circuit 40 of vertical section 28 after correction is synchronized with the timing pulse RDST (FIG. 21A) and has 96 samples in each sub-block, for each of which there is a data blanking period corresponding to the other synchronizing signals and the address and identifying signals and a data blanking period corresponding to the parity data. Such data series RDo is supplied to the corresponding time base expander circuit 19A or 19B (FIG. 5) and then provided through the interface 20 to the D/A converter circuit 21, by which the data series DRo is returned to the original analog signal configuration in which video signals exist in the period other than the horizontal and the vertical blanking periods. Thereafter, suitable synchronizing signals and equalizing pulses are added to the data series DRo in the output processor 22 so that a reproduced analog video signal is obtained at output terminal 23.

A specific embodiment of the vertical judging circuit 37 will now be described with reference to FIG. 20. When even one erroneous sub-block exists in a vertical column in a field, the shift register 77 provides a "1" at that one of its output terminals $Q_1$ to $Q_{36}$ which corresponds to the column containing the erroneous sub-block. Since the horizontal parity data is not included in the data to be corrected, as noted previously, only thirty-six vertical columns need to be judged. Shift registers 78 and 79 are used alternately every field, that is, while shift register 78 counts the number of erroneous blocks in each of the vertical columns in one field, shift register 79 provides the previous count results as an indication of the correctability of the error.

The error block signal ERBLK (FIG. 22D) is applied to shift register 37 through an OR gate 80 which also receives a signal fed back from the thirty-sixth output terminal $Q_{36}$ of shift register 77. Shift register 77 is supplied at its clear terminal with the timing pulse VBWEN (FIG. 22E) and, in the period in which this timing pulse is "0", the shift register 77 is cleared. AND gates 81 and 82 produce a shift pulse CK1 (FIG. 22I) when each of the pulses VBWEN, VPCEN and FBLKS is "1", and such shift pulse CK1 is, in turn, supplied to shift register 77. FIGS. 22A-22O illustrate the first three horizontal row periods $TH_0$, $TH_1$ and $TH_2$ of the field in which the field switching pulse SVSL (FIG. 22A) is "0". As noted, shift pulse CK1 (FIG. 22I) is derived from timing pulses VBWEN (FIG. 22E), VPCEN (FIG. 22C) and FBLKS (FIG. 22F). The error block signal ERBLK (FIG. 22D), starting with the horizontal row period $TH_1$, is applied through OR gate 80 to shift register 77. Since the error block signal ERBLK is "1" for the sub-block which has not been corrected by the horizontal parity and "0" for a correct sub-block, as described previously, if error block signal ERBLK is "1", for example, with respect to sub-block $SB_2$ in the first horizontal row, then shift register 77 provides "1" only at its output terminal $Q_{35}$. The error block signal ERBLK is also generated at each sub-block of the horizontal parity data, but since the generation of the shift pulse CK1 is inhibited in the period for the horizontal parity data, the error block signal is not then applied to shift register 77. The foregoing operation is carried out repeatedly, and, in the event that it is detected, in the twenty-two horizontal rows of the matrix including the twenty-second vertical parity data, that one or more erroneous sub-blocks exist in any of the first to thirty-sixth columns, the shift register 77 provides "1" at each of its output terminals corresponding to the column of those sub-blocks. Numerals attached to the error block signal ERBLK in FIG. 22D and the data from the horizontal section in FIG. 22L indicate the numbers of the sub-blocks, and any numerals attached to the other waveforms of FIGS. 22A–22O indicate time slots.

The output derived at the output terminal $Q_{37}$ of shift register 77 and the error block signal ERBLK are supplied to an AND gate 87 (FIG. 20). The output from the output terminal $Q_{37}$ is taken out with a 1-bit time lag so that such output can be timed with the error block signal ERBLK. In the case of the error block signal ERBLK being "1" for the sub-block $SB_2$, as described previously, the error block signal ERBLK for the sub-block $SB_{41}$ is applied to AND gate 87 at the time that the shift register 77 provides "1" at the output terminal $Q_{37}$, so that with the error block signal ERBLK also being "1", the output from AND gate 87 become "1". In other words, supplying to AND gate 87 the error block signal for each column, as detected and held by shift register 77, and the error block signal ERBLK for the sub-block after one horizontal row in synchronization with each other, in terms of column, is merely a way of detecting whether or not each of the columns contains two or more sub-blocks for which the error block signals ERBLK are "1". When any column contains two or more erroneous sub-blocks and produces "1" at the output of AND gate 87, the errors in the respective sub-blocks cannot be corrected by the vertical parity data.

The output from AND gate 87 is provided to AND gates 88A and 88B (FIG. 20) which have their outputs respectively applied through OR gates 89A and 89B to shift registers 78 and 79. The outputs obtained at output terminals $Q_{36}$ of shift registers 78 and 79 are respectively fed back to the inputs thereof through OR gates 89A and 89B. If the results of the detection, that is, the output of AND gate 88A and 88B becomes "1" even once, the results of the detection in respect to the column is held by the described feedback. The shift registers 78 and 79 are supplied with a clear pulse through NAND gates 90A and 90B. The clear pulse is generated at the beginning of each field period by an RS flip-flop 92 from timing pulses $\overline{RDST}$ and $\overline{VBREN}$. The field switching pulse SVSL (FIG. 22A) is inverted by an inverter 91 and applied to AND gate 88A and NAND gate 90A. Consequently, in the field period in which field switching pulse SVSL is "0", the output from the AND gate 87 is supplied through AND gate 88A and OR gate 89A to shift register 78, and the shift register 78 is cleared by the clear pulse applied thereto through NAND gate 90A at the beginning of each field period.

In the field period in which the field switching pulse SVSL is "0", the other shift register 79 only circulates its content via the feedback loop extending from the output terminal $Q_{36}$ to OR gate 89B. Thus, in the field period in which switching pulse SVSL is "0", shift register 78 provides from the error block signal $\overline{ERBLK}$ of the present field a detection signal $\overline{CRCTBL}$ indicating whether each sub-block thereof is correctable or not. During the same period, the other shift register 79 holds a judging signal $\overline{CRCTV}$ for finally indicating whether each column is correctable or not, based on the error block signal in the previous field. In the field period in which the field switching pulse SVSL is "1", the above operations are exchanged, that is, shift register 79 generates the detection signal $\overline{CRCTBL}$ and shift register 78 generates the judging signal $\overline{CRCTV}$.

The detection signal $\overline{CRCTBL}$ is derived from the output terminal $Q_1$ of shift register 78 or 79, and the judging signal $\overline{CRCTV}$ is derived from the output terminal $Q_{36}$ of shift register 78 or 79. A multiplexer 93 determines from which one of the shift registers 78 and 79 is taken out the detection signal $\overline{CRCTBL}$ or the judging signal $\overline{CRCTV}$. The multiplexer 93 is switched by the field switching pulse SVSL. In the case of the field switching pulse SVSL being "0", the input to the side A of the multiplexer 93 becomes its output, and in the case of the field switching pulse SVSL being "1", the input to the side B is the output. These outputs from multiplexer 93 are inverted by inverters 95 and 96 to obtain the detection signal CRCTBL and the judging signal CRCTV. If the detection signal CRCTBL and the judging signal CRCTV are "1", it means that the block is correctable, whereas if the signal CRCTBL or CRCTV is "0", it means that the block is uncorrectable. The detection signal CRCTBL may sometimes be inverted from "1" to "0" during a field, that is, the signal is "1" when only one sub-block is erroneous, but the signal becomes "0" as soon as two or more erroneous blocks are counted.

Since shift registers 77 and 78 perform the above operations alternately at every field, the shift pulses to the shift registers are also switched at every field by a multiplexer 94. More particularly, a shift pulse CK2 (FIG. 22J) is derived by AND gates 81 and 83 from the timing pulses VBWEN, VPCEN and VBLKS. The timing pulse VBLKS (FIG. 22G) is of the sub-block period and is delayed slightly in respect to timing pulse FBLKS (FIG. 22F) and, consequently, the shift pulse CK2 is somewhat delayed in phase relative to shift pulse CK1. A shift pulse CK3 (FIG. 22K) is based on the timing pulses VBREN, VPCEN and $\overline{VBLKS}$ and is produced by an inverter 84 receiving pulse VBLKS and AND gates 85 and 86. Since the timing pulse VBREN becomes "1" from the beginning of the field (FIG. 22B), and since the timing pulse $\overline{VBLKS}$ is as shown on FIG. 22H, shift pulse CK3 has the configuration shown on FIG. 22K. The shift pulse CK2 (FIG. 22J) is applied to the shift register 78 or 79 which generates the detection signal CRCTBL, and the shift pulse CK$_3$ (FIG. 22K) is supplied to the other shift register 79 or 78 which yields the judging signal CRCTV. For example, in the field in which the field switching pulse SVSL is "0", multiplexer 94 is controlled so that shift pulse CK2 is provided to shift register 78 and shift pulse CK3 is applied to shift register 79.

In the field in which the field switch pulse SVSL is "0", shift pulse CK1 is not supplied to the shift register 77 during the first horizontal row period $TH_0$ but is supplied from the next horizontal row period $TH_1$. Similarly, shift pulse CK2 is applied to the shift register 78 from the horizontal row period $TH_1$. In the horizontal row period $TH_1$, shift register 77 sequentially provides outputs at the output terminal $Q_{37}$ as depicted in FIG. 22M, but since the shift register 77 has been initially in its clear state, such outputs in the horizontal row period $TH_1$ are all "0". Therefore, the output supplied via the AND gates 87 and 88A and the OR gate 89A to the shift register 78 is also "0", and, consequently, the detection signals $\overline{CRCTBL}$ provided at the output terminals $Q_1$ of shift register 78 in the horizontal row period $TH_1$ are all "0", as illustrated in FIG. 22N. On the other hand, in such field in which the field switching pulse SVSL is "0", since the shift register 79 is controlled by shift pulse CK3 to circulate, the judging signal $\overline{CRCTV}$ of the previous field, which indicates the correctability (or uncorrectability) of each of the first to thirty-sixth columns, is repeatedly provided at the output terminal $Q_{36}$ of shift register 79, as shown in FIG. 22O.

In the next horizontal row period $TH_2$, the error block signal $\overline{ERBLK}$ concerning each of the first to thirty-sixth sub-blocks is provided from the output terminal $Q_{37}$ of shift register 77 and supplied to AND gate 87 together with the input error block signal $\overline{ERBLK}$. Accordingly, at the end of the horizontal row period $TH_2$, the content of shift register 78 is "1" only at the position where two erroneous sub-blocks exist in the same column in two respective horizontal rows. Such an operation is repeated for twenty-two horizontal row periods of one field, and the content of shift register 78 ultimately is "1" at each position corresponding to an uncorrectable column. In the next field in which the field switching pulse SVSL is "1", the content of shift register 78 is taken out as the judging signal $\overline{CRCTV}$ by shift pulse CK3, and shift pulse CK2 activates shift register 79 to generate the detection signal $\overline{CRCTBL}$.

It will be appreciated that, in the vertical judging circuit described above with reference to FIG. 20, the detection signal CRCTBL and the judging signal CRCTV can be produced merely by the shift registers 77, 78 and 79, and there is no need to provide numerous counters respectively corresponding to the thirty-six columns. Therefore, the vertical judging circuit can be relatively simple in construction.

As illustrated in FIG. 13, the detection signal CRCTBL from vertical judging circuit 37 is applied to the memory control circuit 39 to control the writing of data in sub memory 35. FIG. 23 shows, by way of example, a detailed arrangement that may constitute sub memory 35 and memory control circuit 39.

Two sub memories 97A and 97B and two flag memories 99A and 99B are provided to perform write and read operations alternately at every field, and memory control circuits 98A, 98B and 100 are provided in association with memory 97A, memory 97B and memories 99A and 99B, respectively. The data (DATA. SEQ) from horizontal section 27 is applied as input data to sub memories 97A and 97B, and the output data DTS therefrom is supplied to error correcting circuit 40. The flag memories 99A and 99B store 1-bit vertical error flags SFLA and SFLB, respectively, in respect to all sub-blocks (858) included in a field. The sub memories 97A and 97B each have a capacity large enough to store data of a predetermined number of sub-blocks, for example, six sub-blocks, as described previously. In the field period in which the field switching pulse SVSL is "0", the sub memory 97A and the flag memory 99A carry out write operations and the sub memory 97B and the flag memory 99B perform read operations, and in the next field period in which the field switching pulse SVSL is "1", the operations are exchanged, that is, memories 97B and 99B perform writing operations and memories 97A and 99A perform reading operations.

Address codes from a write address register 101W and read address counter 101R are selectively provided to flag memories 99A and 99B. The timing pulse FBLKS (FIG. 22F) and clock pulse RCK (FIG. 18A) are supplied to a load pulse generator 102, and a 10-bit address signal in the data DATA SEQ. from the horizontal section 27 is loaded by a load pulse from generator 102 in the write address register 101W. Further, the timing pulses FBLKS and RDST (FIG. 21A) are fed to a clear pulse generator 103 which provides therefrom a clear pulse at the beginning of a field, and which is provided to read address counter 101R for clearing the latter. The address counter 101R thereafter counts the timing pulse FBLKS, by which the read address steps one-by-one for each sub-block. The write address signal and the read address signal, each having a parallel, 10-bit configuration, are provided to multiplexers 104A and 104B. In the field period in which the field switching pulse SVSL is "1", the read address signal is selected by the multiplexer 104A and applied to flag memory 99A and, at the same time, the write address signal is selected by multiplexer 104B and applied to flag memory 99B.

Timing signals VPCEN (FIG. 21C) and VBENT (FIG. 21E) are applied to an AND gate 105 which has its output connected to flag memory control circuit 100. The memory control circuit 100 is adapted to generate write pulses for flag memories 99A and 99B only in the periods in which the output from the AND gate 105 is "1". Thus, no write pulse is provided in respect of the sub-blocks which concern the horizontal and the vertical parity data, and the vertical error flags concerning such parity data are always "0". The foregoing also applies to the writing of data in sub-memories 97A and 97B. More particularly, timing signals VPCEN and VBENT are applied to the memory control circuits 98A and 98B, so that the writing of the parity data in sub-memories 97A and 97B is prevented.

The error block signal ERBLK and the detection signal CRCTBL from vertical judging circuit 37 are applied to an AND gate 106. When both of these signals ERBLK and CRCTBL are "1" to provide an output "1" from AND gate 106, it means that the sub-block is correctable and erroneous. Even in the case that the detection signal CRCTBL initially is "1", an erroneous sub-block may later occur in the same column. In that case, the signal CRCTBL will become "0" to indicate that the sub-block is uncorrectable. To avoid this, the output from AND gate 106 is applied to an overflow inhibiting circuit 107 to prevent the sub-memories 97A and 97B from overflowing. The output from overflow inhibiting circuit 107 is provided as data input to each of the flag memories 99A and 99B and, at the same time, is supplied to sub memory control circuits 98A and 98B to control the writing of data in the sub-memories 97A and 97B and the write addresses therefor. More particularly, the data (excluding the parity data, as described above) of the sub-block for which the output from AND gate 106 becomes "1" is written in the sub-memories 97A and 97B, and in this period the clock-pulse RCK causes the write address to step for 96 samples. When the output from AND gate 106 becomes "1" again, the same operation is performed and the write address is again stepped for 96 samples.

Thus, in a field defined by the field switching pulse SVSL, a maximum of six correctable erroneous sub-blocks are stored in the sub memory 97A or 97B, and "1" is written at each of the addresses of the flag memory 99A or 99B corresponding to the stored sub-blocks. In another field defined by field switching pulse SVSL, the read address signal which is provided by read address counter 101R and steps at every sub-block is applied to flag memory 99A or 99B, and the read output therefrom is the vertical error flag SFLA or SFLB which is selected by multiplexer 108 and combined into a vertical error flag SFLG. The vertical error flag SFLA or SFLB read out from the flag memory 99A or 99B is also applied to memory control circuit 98A or 98B to cause the read address for sub-memory 97A or 97B to be stepped by one in each sub-block period in which the vertical error flag SFLA or SFLB is "1". In this way, data of a correctable erroneous sub-block is read out from sub-memory 97A or 97B in a predetermined time slot in which the vertical error flag SFLG is "1".

Referring now to FIG. 24, it will be seen that the overflow inhibiting circuit 107 may comprise a counter 109 in which a preset input of a predetermined value is loaded from a preset input generator 110 by applying to a load terminal of counter 109 the timing pulse RDST indicating the beginning of the field. In the example described above, that is, where a maximum of six correctable erroneous sub-blocks are to be stored in sub-memory 97A or 97B, a numerical value of 6 is applied as the preset input to counter 109. The output from the AND gate 106 is applied as one input to an AND gate 111 which has its output applied as a subtraction input to counter 109. A carry output from the counter 109 is applied as the other input to AND gate 111. The carry output is set to "1" by loading of the preset input into counter 109 and becomes "0" when the output from the AND gate 106 exceeds the preset number. Accordingly, after this, the output from AND gate 111, and hence the output of circuit 107, becomes "0" to prevent sub memory 97A or 97B from overflowing.

Referring now to FIG. 25, it will be seen that the error correcting circuit 40 of vertical section 28 receives the vertical syndrome sequence SDV (FIG. 21J) from vertical parity checker 36, the data series DTF read out from field memory 34 and the data series DTS read out from the sub-memory 35 (that is, from sub-memories 97A and 97B in FIG. 23). Within circuit 40, the judging signal CRCTV, after being delayed by a shift register 113, and the vertical error flag SFLG are supplied to an AND gate 112 which provides a select signal SLCT as its output. The vertical syndrome SDV is also applied to delay shift register 114 for phase synchronization. The select signal SLCT turns ON and OFF a gate circuit 115 which is supplied with the vertical syndrome SDV, and a multiplexer 116 is also controlled by select signal SLCT for selecting the data series DTF or DTS. The outputs from gate circuit 115 and multiplexer 116 are supplied to a modulo-2 adder 117 for correcting any errors, and from which is derived the output data series DRo.

In the case of select signal SLCT being "0", gate circuit 115 is turned OFF and its output becomes "0", and at the same time, the data series DTF is selected by multiplexer 116 for application to adder 117. In the case of select signal SLCT being "1", gate circuit 115 is turned ON to supply vertical syndrome SDV to adder 117, and data series DTS is selected by multiplexer 116 and also fed to the adder 117.

Four combinations of "1" and "0" of the judging signal CRCTV and the vertical error flag SFLG will be hereinafter described:

(1) CRCTV="0", SFLG="0" (SLCT="0") Since the sub-block is uncorrectable but at least no longer erroneous, the data series DTF is selected and is taken out as the output data series DRo. This case includes the case wherein the sub-block is originally correct.

(2) CRCTV="1", SFLG="0" (SLCT="0") Since the sub-block is correctable but not erroneous, the data series DTF is again selected.

(3) CRCTV="0", SFLG="1" (SLCT="0") The sub-block is uncorrectable and erroneous. Accordingly, the data series DTF from the field memory 34 is taken out as the output data series DRo. The writing of the erroneous sub-block in field memory 34 is inhibited, and the sub-block appearing in the data series DTF is comprised of data included in the line of the previous field positioned one line below that containing the erroneous data. That is, an error concealment operation takes place.

(4) CRCTV="1", SFLB="1" (SLCT="1") The sub-block is correctable and erroneous. Only for the foregoing conditions does the select signal SLCT become "1", and, as a result thereof, data series DTS from sub-memory 35 is selected by multiplexer 116. At the same time, gate circuit 115 is turned ON, and the sub-block in the data series DTS and the vertical syndrome corresponding thereto are subjected to modulo-2 addition in adder 117, thereby correcting the error.

It will be understood from the above description of an embodiment of the present invention, that a field memory and a sub memory are provided with correct data being stored in the field memory and data for error correction being stored in the sub-memory, so that error correction and/or error concealment can be easily carried out. Further, since erroneous data is inhibited from being written in the field memory and is interpolated by the data of the previous field positioned one line below in the pictorial representation of a complete frame, the interpolation can be effected with data having a relatively higher correlation with the erroneous data than does data in an adjacent line of the same field. Further, no calculating circuit is needed for the interpolation unlike the existing arrangements in which the interpolation data is produced by means of calculation. In accordance with the present invention, only data of a correctable and erroneous sub-block is written in the sub memory, so that the capacity of the latter can be relatively small. In the writing of data in the sub-memory 35, the address therefor is stored by an error flag, so that the read out of data from the sub-memory and its error correction can be performed with ease. Moreover, in accordance with the present invention, the judgement as to whether an error in the column direction is correctable or not can be achieved by a simple arrangement which, as shown on FIG. 20, merely employs three shift registers.

In the foregoing embodiment of the invention, the data of each field is recorded in two parallel tracks $T_A$ and $T_B$, but it will be apparent that the data for each field may also be recorded in one track or in three or more parallel tracks. Furthermore, the error correction code need not be limited to the specifically described parity code, but other correction codes may be similarly used.

In the embodiment of the invention described above, it has been assumed that the luminance and chrominance components of the digital color video signal are suitably separated from each other at some point after being read out of field memory 34 in error correcting decoder 18A or 18B. In other words, the data stored in field memory 34 and in sub-memory 35 represents a composite color video signal having both luminance and chrominance components. However, if desired, the present invention can be similarly applied to an arrangement in which the reproduced digital color video signal of each channel is suitably separated into its luminance and chrominance components either at or in advance of the respective error correcting decoder, in which case the field memory of the error correcting decoder is divided into a luminance signal memory and a chrominance signal memory in which the separated luminance and chrominance components, respectively, of each error-free field are to be temporarily stored. For example, as shown schematically on FIG. 26, a field memory 34' of each of the error correcting decoders 18A and 18B may include a separator 118 which suitably separates the luminance and chrominance components from the output of the correction circuit 33 on FIG. 13, and which applies such luminance and chrominance components to a luminance signal memory 34'$a$ and a chrominance signal memory 34'$b$, respectively. The memories 34'$a$ and 34'$b$ may be controlled from the field memory control circuit 38 so that only signals which are error-free, as received from horizontal correction circuit 33, have their luminance and chrominance components stored or written in memories 34'$a$ and 34'$b$, respectively. The luminance and chrominance components read out of memories 34'$a$ and 34'$b$ are applied to an adder or combining circuit 119 so as to reconstitute the digital composite color video signal which is to be applied to the vertical correction circuit 40 of FIG. 13. Apart from the foregoing, the error correcting decoder which includes the field memory 34' of FIG. 26 may be similar to the error correcting decoder 18A or 18B of FIG. 13, or the sub-memory 35 of the latter may also be divided into sub-memories (not shown) for respectively storing temporarily the luminance and chrominance components of the error-containing signals received from circuit 33 and being correctable in circuit 40.

Having described various embodiments of the invention with reference to the accompanying drawings, it is to be understood that the invention is not limited to these precise embodiments and that many modifications and variations may be effected therein by one skilled in the art without departing from the scope or spirit of the invention which is intended to be defined by the appended claims.

What is claimed is:

1. A method of processing a digital signal which forms a data block for every predetermined number of bits, and which includes error detecting and error correcting signals, said method comprising the steps of:

detecting each said error signal as an indication of an error in a respective data block of said digital signal;

writing in a first memory each data block which is free of error;

writing in a second memory a data block containing an error;

selectively reading out a data block from said first and second memories; and correcting an error of a data block read out from said second memory by means of the respective error correcting signal.

2. A method according to claim 1; wherein said digital signal has been converted from an analog video signal.

3. A method according to claim 2; wherein said first memory has a capacity equivalent to one field of said video signal.

4. A method according to claim 1; further comprising the steps of:

judging whether an error contained in a data block is correctable by the respective error correcting signal; and inhibiting said writing in second memory of any error-containing data block which is not correctable by said respective error correcting signal.

5. A method of processing an analog video signal composed of successive frames each having a plurality of fields constituted by successive respective lines which are interlaced in a pictorial representation of the complete frame, said method comprising the steps of:

converting said analog video signal to a digital signal;

forming a data block for each predetermined number of bits of said digital signal;

adding error detecting and error correcting signals to said digital signal;

detecting said error detecting signals as indications of errors in the respective data blocks of said digital signal;

writing each error-free data block at an address in a first memory corresponding to that at which there was earlier written a data block of a line of the next previous field which, in said pictorial representation of the complete frame, is positioned immediately adjacent the line of said error-free data block being written;

inhibiting the writing of an error-containing data block in said first memory;

writing said error-containing data block in a second memory;

reading out a data block selectively from said first and second memories; and correcting an error in a data block read out from said second memory by means of the respective error correcting signal.

6. A method according to claim 5; further comprising the steps of:

judging whether an error contained in a data block is correctable by the respective error correcting signal; and inhibiting said writing in said second memory of any error-containing data block which is not correctable by said respective error correcting signal.

7. A method according to claim 5;

wherein said analog video signal is a color video signal having a chrominance component with a color subcarrier which changes in phase at selected lines of each of said fields; and wherein said line of the next previous field is positioned, in said pictorial representation, immediately below said line of the error-free data block being written and has said color subcarrier phase synchronized with that in said line of the error-free data block being written.

8. A method of processing a digital signal, comprising the steps of:

forming a data block of each predetermined number of bits of said digital signal;

adding an error detecting code to each said data block to form a signal block therewith;

arranging a plurality of the signal blocks in a matrix form having rows and columns;

adding error correcting codes for each said row and column of said matrix form;

detecting said error detecting code as an indication of an error being contained in the respective data block; and correcting said error in the error-containing data block by means of the error correcting codes corresponding to the row and column of said matrix form in which said error-containing data block is situated.

9. A method according to claim 8; wherein said correcting of the error in said error-containing data block includes a first correction effected with one of said error correcting codes of the row and column, respectively, in which said error-containing data block is situated and a second correction effected with the other of said error correcting codes of said row and column, respectively, in which said error-containing data block is situated.

10. A method according to claim 9; in which said second correction is effected after said first correction when the latter fails to fully correct the error-containing data block.

11. A method according to claim 10; wherein said digital signal has been converted from an analog video signal composed of successive frames each having a plurality of fields constituted by successive respective lines which are interlaced in a pictorial representation of the complete frame; and further comprising the steps of writing each said data block which is error free, at least following said first correction, at an address in a first memory corresponding to that at which there was earlier written a data block of a line of the next previous field which, in said pictorial representation of the complete frame, is positioned immediately adjacent the line of said error-free data block being written;

writing in a second memory a data block which, following said first correction, contains an error correctable by said second correction; and reading out a data block selectively from said first and second memories with said second correction being effected on a data block read out of said second memory.

12. A method according to claim 11; further comprising the steps of inhibiting the writing in said first memory of any data block which contains an error after said first correction;

inhibiting the writing in said second memory of any data block which contains an error uncorrectable by said second correction; and causing said reading out from said first memory upon said inhibiting of the writing in said second memory.

13. An apparatus for processing a digital signal which forms a data block for every predetermined number of bits, and which includes error detecting and error correcting signals, said apparatus comprising:

error detecting means for detecting each said error detecting signal as an indication of an error in a respective data block of said digital signal;

first memory means for storing each data block which is error-free;

second memory means for storing a data block which has been indicated by said error detecting means to contain an error;

selector means for selectively reading out the contents of said first and second memory means; and error correcting means employing said error correcting signals for correcting said error detected by said error detecting means.

14. An apparatus according to claim 13; wherein said second memory means includes a data memory for storing a data block and a flag memory for storing a flag signal corresponding to an address in said data memory at which the data block is stored, said flag signal indicating that the data block stored at the respective address contains an error.

15. An apparatus according to claim 13; wherein said digital signal has been converted from an analog video signal composed of successive frames each having a plurality of fields constituted by successive respective lines which are interlaced in a pictorial representation of the complete frame; and further comprising control means for said first memory means causing the writing of each error-free data block at an address in said first memory means corresponding to that at which there was earlier written a data block of a line of the next previous field which, in said pictorial representation of the complete frame, is positioned immediately adjacent the line of said error-free data block being written.

16. An apparatus according to claim 15; wherein said first memory means has a capacity substantially equivalent to one field of said video signal.

17. An apparatus according to claim 15; wherein said analog video signal is a color video signal having a chrominance component with a color subcarrier which changes in phase at selected lines of each of said fields; and wherein said line of the next previous field is positioned, in said pictorial representation, immediately below said line of the error-free data block being written in said first memory means and has said color subcarrier phase synchronized with that in said line of the error-free data block being written.

18. An apparatus according to claim 15; further comprising means for judging if an error contained in a data block is correctable by the respective error correcting signal; and means for inhibiting said writing in said second memory means of any error-containing data block which is not correctable by said respective error correcting signal.

19. An apparatus for processing a digital signal comprising:

means for forming a data block of each predetermined number of bits of said digital signal;

means for adding an error detecting code to each said data block to form a signal block therewith;

means for arranging a plurality of the signal blocks in a matrix form having rows and columns;

means for adding error correcting codes for each said row and column of said matrix form;

means for detecting said each error detecting code as an indication of an error being contained in the respective data block; and means for correcting said error in the error-containing data block by means of the error correcting codes corresponding to the row and column of said matrix form in which said error-containing data block is situated.

20. An apparatus according to claim 19; wherein said means for correcting the error in said error-containing data block includes first correction means employing one of said error correcting codes of the row and column, respectively, in which said error-containing data block is situated, and second correction means employing the other of said error correcting codes of said row and column, respectively, in which said error-containing data block is situated.

21. An apparatus according to claim 20; in which said second correction means is operative after said first correction means when the latter fails to fully correct the error-containing data block.

22. Apparatus for processing an analog video signal composed of successive frames each having a plurality of fields constituted by successive respective lines which are interlaced in a pictorial representation of the complete frame, said apparatus comprising:

means for converting said analog video signal to a digital signal;

means for forming a data block for each predetermined number of bits of said digital signal;

means for adding error detecting and error correcting signals to said digital signal;

means for detecting said error detecting signals as indications of errors in the respective data blocks of said digital signal;

first and second memory means;

means for writing each error-free data block at an address in said first memory means corresponding to that at which there was earlier written a data block of a line of the next previous field which, in said pictorial representation of the complete frame, is positioned immediately adjacent the line of said error-free data block being written;

means for writing said error-containing data block in said second memory means;

means for reading out a data block selectively from said first and second memories; and means for correcting an error in a data block read out from said second memory means by means of the respective error correcting signal.

23. An apparatus according to claim 22; further comprising:

means for judging whether an error contained in a data block is correctable by the respective error correcting signal; and means for inhibiting the writing in said second memory means of any error-containing data block which is not correctable by said respective error correcting signal.

24. Apparatus for processing an analog video signal composed of successive frames each having a plurality of fields constituted by successive respective lines which are interlaced in a pictorial representation of the complete frame, said apparatus comprising:

means for converting said analog video signal to a digital signal;

means for forming a data block of each predetermined number of bits of said digital signal;

means for adding an error detecting code to each said data block to form a signal block therewith;

means for arranging a plurality of the signal blocks in a matrix form having rows and columns;

means for adding error correcting codes for each said row and column of said matrix form;

means for transmitting and receiving said digital signal in said matrix form with said error detecting and error correcting codes added thereto;

means for detecting each said error detecting code as an indication of an error being contained in the respective data block of the received signal;

first and second memory means;

first correction means employing one of said error correcting codes of the row and column, respectively, in which said error-containing data block is situated for correcting the error therein;

means for writing in said first memory means each data block which is error-free at least after the action thereon of said first correction means, said error-free data block being written at an address in said first memory means corresponding to that at which there was earlier written a data block of a line of the next previous field which, in said pictorial representation of the complete frame, is positioned immediately adjacent the line of said error-free data block being written;

second correction means employing the other of said error correcting codes of the row and column, respectively, in which said error-containing data block is situated for correcting an error remaining therein after the operation of said first correction means;

means for writing in said second memory means a data block which, following said operation of the first correction means, contains an error correctable by said second correction means; and means selectively reading out a data block from said second memory means to said second correction means when said read-out data block contains an error correctable by said other error correcting code or reading out an error-free data block from said first memory means.

* * * * *